(12) United States Patent
Tracz et al.

(10) Patent No.: US 11,762,628 B2
(45) Date of Patent: *Sep. 19, 2023

(54) TEXT INPUT DEVICE AND METHOD THEREFOR

(71) Applicant: SAMSUNG ELECTRONICS CO., LTD., Suwon-si (KR)

(72) Inventors: Pawel Tracz, Warsaw (PL); Szymon Leski, Pruszkow (PL)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/524,946

(22) Filed: Nov. 12, 2021

(65) Prior Publication Data

US 2022/0075593 A1    Mar. 10, 2022

Related U.S. Application Data

(63) Continuation of application No. 17/093,148, filed on Nov. 9, 2020, now Pat. No. 11,194,547, which is a
(Continued)

(30) Foreign Application Priority Data

Jun. 22, 2018    (KR) .................. 10-2018-0071817

(51) Int. Cl.
*G06F 3/16*    (2006.01)
*G10L 15/26*    (2006.01)

(52) U.S. Cl.
CPC .............. *G06F 3/167* (2013.01); *G10L 15/26* (2013.01)

(58) Field of Classification Search
None
See application file for complete search history.

(56) References Cited

U.S. PATENT DOCUMENTS 6,401,065 B1    6/2002    Kanevsky et al.
6,424,357 B1    7/2002    Frulla et al.
(Continued)

FOREIGN PATENT DOCUMENTS

DE    202017105669 U1    5/2018
EP    2 133 869 A2    12/2009
(Continued)

OTHER PUBLICATIONS

Communication dated Apr. 1, 2021, issued by the European Patent Office in counterpart European Application No. 19823450.2.
(Continued)

*Primary Examiner* — Jonathan C Kim
(74) *Attorney, Agent, or Firm* — Sughrue Mion, PLLC

(57) ABSTRACT

Electronic device includes display, microphone, and processor configured to activate voice input function based on user input, display graphic representation for indicating that the voice input function is activated, provide, on the display, a text display area for displaying text inputted by a plurality of user input methods and a keyboard input interface for receiving a user keyboard input, the plurality of user input methods including user keyboard input method and user voice input method, receive, via the keyboard input interface, the user keyboard input corresponding to a first text, display the first text in the text display area based on receiving the user keyboard input, receive user voice input corresponding to a second text while the keyboard input interface is provided and the voice input function is activated, and display the second text next to the first text in the text display area based on the user voice input.

18 Claims, 16 Drawing Sheets

Related U.S. Application Data continuation of application No. PCT/KR2019/007521, filed on Jun. 21, 2019.

(56) References Cited

U.S. PATENT DOCUMENTS

| | | | |
|---|---|---|---|
| 8,065,143 B2 | 11/2011 | Yanagihara | |
| 8,543,394 B2 | 9/2013 | Shin | |
| 8,830,165 B1* | 9/2014 | Heath | G06F 3/0481 |
| | | | 704/4 |
| 9,135,914 B1* | 9/2015 | Bringert | G10L 15/22 |
| 9,207,906 B2 | 12/2015 | Kim et al. | |
| 9,619,202 B1* | 4/2017 | Weingartner | G10L 13/08 |
| 9,842,588 B2 | 12/2017 | Kim et al. | |
| 10,129,720 B1* | 11/2018 | Bouzid | H04M 1/72403 |
| 10,423,240 B2 | 9/2019 | Ryu et al. | |
| 10,720,176 B2 | 7/2020 | Burke et al. | |
| 2005/0131686 A1* | 6/2005 | Yamamoto | G06F 3/0237 |
| | | | 704/231 |
| 2007/0260972 A1* | 11/2007 | Anderl | H04M 3/4938 |
| 2008/0195388 A1* | 8/2008 | Bower | G10L 15/19 |
| | | | 704/E15.021 |
| 2009/0240488 A1* | 9/2009 | White | G10L 15/30 |
| | | | 345/173 |
| 2009/0306980 A1* | 12/2009 | Shin | H04M 1/72436 |
| | | | 704/235 |
| 2010/0031143 A1* | 2/2010 | Rao | G06F 3/0237 |
| | | | 704/E15.001 |
| 2013/0046544 A1* | 2/2013 | Kay | G06F 3/023 |
| | | | 345/169 |
| 2013/0225240 A1* | 8/2013 | Largey | G06F 3/0233 |
| | | | 704/E15.001 |
| 2013/0300666 A1* | 11/2013 | Archer | G06F 3/0237 |
| | | | 345/168 |
| 2014/0040748 A1* | 2/2014 | Lemay | G06F 3/04817 |
| | | | 715/728 |
| 2014/0330561 A1 | 11/2014 | Cho et al. | |
| 2014/0379341 A1* | 12/2014 | Seo | G06F 1/163 |
| | | | 704/246 |
| 2015/0287423 A1* | 10/2015 | Burke | G10L 25/78 |
| | | | 704/275 |
| 2015/0317299 A1* | 11/2015 | Park | G06F 3/167 |
| | | | 704/275 |
| 2016/0154624 A1* | 6/2016 | Son | G06F 3/0416 |
| | | | 704/235 |
| 2016/0252972 A1* | 9/2016 | Kim | G10L 15/26 |
| | | | 704/9 |
| 2017/0092267 A1 | 3/2017 | Singleton et al. | |
| 2017/0097806 A1* | 4/2017 | Joshi | H04L 51/10 |
| 2017/0116990 A1 | 4/2017 | Faaborg et al. | |
| 2018/0011688 A1* | 1/2018 | Wei | G06F 3/0233 |
| 2018/0151180 A1 | 5/2018 | Yehuday | |
| 2018/0188948 A1* | 7/2018 | Ouyang | G06F 40/166 |
| 2018/0196782 A1* | 7/2018 | Gray | G06F 3/167 |
| 2018/0314343 A1* | 11/2018 | Montaldi | G06F 40/274 |
| 2018/0342248 A1* | 11/2018 | Rabinovici | G06F 3/0233 |
| 2019/0050391 A1* | 2/2019 | Knox | G06F 3/0237 |
| 2020/0058298 A1* | 2/2020 | Ban | G06F 3/0237 |
| 2021/0019046 A1* | 1/2021 | Ouyang | G06F 3/0233 |

FOREIGN PATENT DOCUMENTS

| | | |
|---|---|---|
| KR | 1020090130350 A | 12/2009 |
| KR | 1020140131093 A | 11/2014 |
| KR | 1020150098096 A | 8/2015 |
| KR | 10-2015-0125338 A | 11/2015 |
| KR | 1020160010961 A | 1/2016 |
| KR | 1020160039244 A | 4/2016 |
| KR | 10-2017-0101730 A | 9/2017 |
| KR | 1020180019752 A | 2/2018 |
| WO | 2010/054373 A2 | 5/2010 |

OTHER PUBLICATIONS

International Search Report (PCT/ISA/210) and Written Opinion (PCT/ISA/237) dated Oct. 1, 2019 issued by the International Searching Authority in International Application No. PCT/KR2019/007521.

Communication dated Aug. 30, 2021 by the Intellectual Property Office of India in counterpart Indian Patent Application No. 202037046283.

Office Action dated Feb. 2, 2023, issued by Korean Intellectual Property Office for Korean Application No. 10-2018-0071817.

Office Action dated May 12, 2023, issued by European Patent Office in European Patent Application No. 19823450.2.

Communication dated Jul. 18, 2023, issued by the Korean Intellectual Property Office in counterpart Korean Application No. 10-2018-0071817.

* cited by examiner

TEXT INPUT DEVICE AND METHOD THEREFOR

CROSS-REFERENCE TO RELATED APPLICATIONS

This is a Continuation of U.S. application Ser. No. 17/093,148, filed Nov. 9, 2020, which is Continuation of International Application No. PCT/KR2019/007521, which was filed on Jun. 21, 2019 and claims priority to Korean Patent Application No. 10-2018-0071817, filed on Jun. 22, 2018. The contents of the above-named applications are incorporated by reference herein in their entireties.

BACKGROUND

1. Field

The present disclosure relates to a device and method for inputting a text in response to a voice input.

2. Description of Related Art

With the development of information technology (IT), electronic devices, such as smartphones, which perform various functions in combination have been developed, and electronic devices having a voice recognition function have been released in order to improve operability. A voice recognition function has an advantage that enables a device to be easily controlled by recognizing a user's voice without contacting a separate operation button or a touch module.

According to a voice recognition function, for example, a portable terminal such as a smartphone may execute a call function, write a text message, and easily set various functions such as pathfinding, Internet search, or alarm setting, without pressing a separate button.

There is a need for a text input device and method that provide a voice input interface capable of efficiently recognizing a user voice input.

SUMMARY

A text input device according to an embodiment of the present disclosure includes: a voice input interface configured to recognize a voice input; a script input interface configured to recognize a script input; and a processor configured to determine whether a voice activation condition indicating whether a user's voice input is started is satisfied, activate the voice input interface based on a result of the determining, and simultaneously provide the activated voice input interface and the script input interface.

A text input method according to an embodiment of the present disclosure includes: providing a script input interface configured to recognize a script input; determining whether a voice activation condition indicating whether a user's voice input is started is satisfied; and activating a voice input interface configured to recognize a voice input, based on a result of the determining, and simultaneously providing the activated voice input interface and the script input interface.

A computer-readable recording medium according to an embodiment of the present disclosure may be a computer-readable recording medium having recorded thereon a program for executing the above-described method.

According to an embodiment, a text input device and method that provide a voice input interface recognizing a user voice input may be provided.

BRIEF DESCRIPTION OF DRAWINGS

The present disclosure may be easily understood by combining the following detailed description and the accompanying drawings, and reference numerals refer to structural elements.

DETAILED DESCRIPTION

Figure 1:
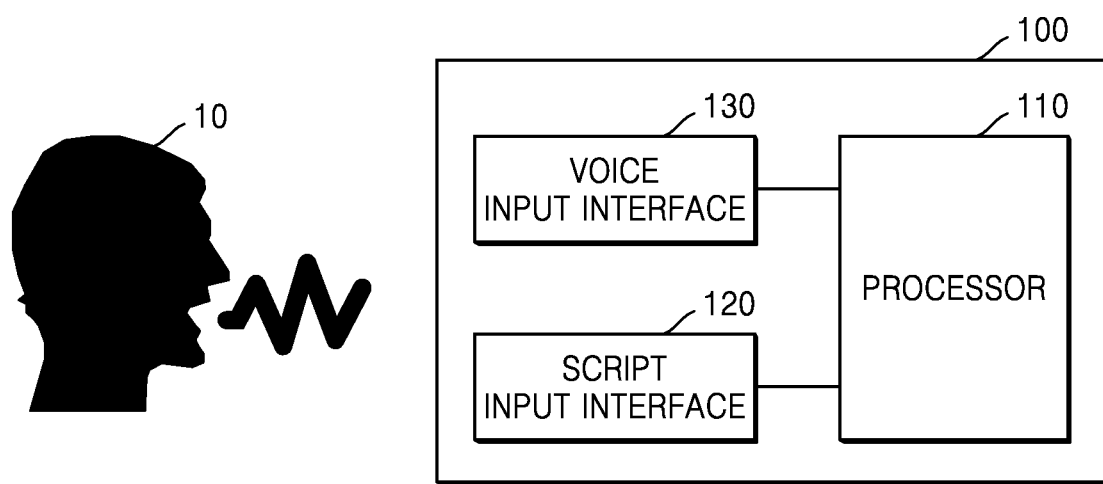
FIG. 1 is a diagram of a text input device according to an embodiment.

A text input device according to an embodiment of the present disclosure includes: a voice input interface configured to recognize a voice input; a script input interface configured to recognize a script input; and a processor configured to determine whether a voice activation condition indicating whether a user's voice input is started is satisfied, activate the voice input interface based on a result of the determining, and simultaneously provide the activated voice input interface and the script input interface.

Hereinafter, embodiments of the present disclosure will be described in detail with reference to the accompanying drawings so that the present disclosure may be easily carried out by those of ordinary skill in the art. However, the present disclosure may be embodied in many different forms and is not limited to the embodiments described herein. Also, in order to clearly describe the present disclosure, parts having no relation to the description are omitted, and like reference numerals are assigned to like elements throughout the specification.

Some embodiments of the present disclosure may be represented by functional block configurations and various processing operations. All or part of such functional blocks may be implemented by any number of hardware and/or software elements configured to perform particular functions. For example, the functional blocks of the present disclosure may be implemented as one or more microprocessors or may be implemented as circuit configurations for certain functions. Also, for example, the functional blocks of the present disclosure may be implemented with various programming or scripting languages. The functional blocks may be implemented as algorithms that are executed on one or more processors. Also, the present disclosure may employ any conventional techniques for electronic environment configuration, signal processing, and/or data processing.

Also, the connecting lines or connecting members illustrated in the drawings are intended to represent exemplary functional connections and/or physical or logical connections between elements. In a real device, connections between elements may be represented by various functional connections, physical connections, or circuit connections that are replaceable or added.

Also, the terms "-er/or" and "module" as used herein represent a unit for processing at least one function or operation, which may be implemented by hardware, software, or a combination thereof. The terms "-er/or" and "module" may be implemented by a program that is stored in an addressable storage medium and is executable by a processor.

For example, the terms "-er/or" and "module" may refer to elements such as software elements, object-oriented software elements, class elements, and task elements, and may include processes, functions, attributes, procedures, subroutines, segments of program code, drivers, firmware, microcode, circuits, data, a database, data structures, tables, arrays, and variables.

The embodiments of the present disclosure, which are described in this specification and drawings, are merely presented as specific examples so as to easily explain the technical contents of the present disclosure and help the understanding of the present disclosure and are not intended to limit the scope of the present disclosure. That is, it will be obvious to those of ordinary skill in the art that other modifications based on the technical idea of the present disclosure may be made. Also, the respective embodiments may be operated in combination with each other as necessary. For example, some portions of one embodiment of the present disclosure and some portions of another embodiment of the present disclosure may be combined with each other so that the device may be operated.

FIG. 1 is a diagram of a text input device according to an embodiment.

Referring to FIG. 1, a text input device 100 includes a processor 110, a script input interface 120, and a voice input interface 130. The processor 110 controls overall operations of the text input device 100.

A user 10 may provide a voice input or a script input to the text input device 100. The voice input is a user's voice including information, for example, text information. The script input is a user's action including information, for example, text information. The user's action may include a contact with the device.

The text input device 100 may receive the script input by using the script input interface 120 and may receive the voice input by using the voice input interface 130. The script input interface 120 may include a keyboard user interface (UI) on which characters, numbers, and symbols are displayed. For UIs included in the script input interface 120, characters may be different for each type of language. For example, a UI for Korean input and a UI for English input may exist separately. The text input device 100 may simultaneously provide the script input interface 120 and the voice input interface 130.

The processor 110 may determine whether a voice activation condition and a voice deactivation condition are satisfied. The voice activation condition may be a result of determining the intention of the user 10 to provide the voice input. The voice deactivation condition may be a result of determining the intention of the user 10 to end providing the voice input. The processor 110 may automatically activate or deactivate the voice input interface 130 based on whether the determined voice activation condition or voice deactivation condition is satisfied.

In an embodiment, the processor 110 may determine whether the voice activation condition is satisfied, based on sound information received by using a microphone. The processor 110 according to the embodiment may activate the microphone based on a previously determined condition. For example, the processor 110 may activate the microphone when the script input is detected. The processor 110 may determine whether user voice information is included in the sound information received by using the microphone, and may determine whether the voice activation condition is satisfied, based on a result of the determining.

In an embodiment, the processor 110 may determine whether the voice activation condition is satisfied, based on a slope of the text input device 100. The slope of the text input device 100 may be measured by using an accelerometer or a gyroscope. The processor 110 may determine whether the voice activation condition is satisfied by comparing the slope of the text input device 100 with a threshold value. Alternatively, the processor 110 may determine whether the voice activation condition is satisfied, based on whether the slope of the text input device 100 is a slope suitable for user face recognition. However, the operation of determining the voice activation condition based on the slope of the text input device 100 is not limited to the above-described embodiments.

In an embodiment, the processor 110 may determine whether the voice activation condition is satisfied, based on a distance from the user's face to the text input device 100. The processor 110 according to the embodiment may determine the distance from the user's face to the text input device 100 based on image information received by using a camera. The processor 110 may determine whether the voice activation condition is satisfied by comparing the aforementioned distance with a threshold value. Alternatively, the processor 110 may determine whether the voice activation condition is satisfied, based on whether the aforementioned distance is a distance suitable for user face recognition. However, the operation, performed by the processor 110, of determining the voice activation condition based on the distance is not limited to the above-described embodiments.

In an embodiment, the processor 110 may determine whether the voice activation condition is satisfied, based on a determination of a user's lip movement. The processor 110 according to the embodiment may activate a camera on the user side, for example, a front camera, based on a previously determined condition. For example, the processor 110 may activate the camera when the script input is detected. The processor 110 may determine the user's lip movement based on image information received by using a camera. For example, the processor 110 may determine whether the voice activation condition is satisfied, based on whether the user's lip movement included in the received image information corresponds to the voice input.

In an embodiment, the processor 110 may determine whether the voice activation condition is satisfied, based on context information. The context information may include at least one of surrounding environment information of the text input device 100, state information of the text input device 100, user state information, user's usage history information of the text input device 100, and user schedule information, but the present disclosure is not limited thereto.

The surrounding environment information of the text input device 100 refers to environment information within a certain radius from the text input device 100, and may include weather information, temperature information, humidity information, illumination information, noise information, sound information, time information, and the like. For example, when the surrounding environment is a crowded area, the text input device 100 may determine that the voice activation condition is not satisfied. Alternatively, when a current time is not a late time, the text input device 100 may satisfy the voice activation condition with a higher frequency. However, the surrounding environment information included in the context information is not limited thereto.

The state information of the text input device 100 may include mode information of the text input device 100 (e.g., a sound mode, a vibration mode, a silent mode, a power saving mode, a blocking mode, a multi-window mode, an automatic rotation mode, etc.), location information of the text input device 100, time information, communication module activation information (e.g., Wi-Fi ON/Bluetooth OFF/GPS ON/NFC ON, etc.), network connection state information of the text input device 100, information about an application executed in the text input device 100 (e.g., application identification information, application type, application use time, application use cycle, etc.), and the like. For example, the text input device 100 may determine whether the voice activation condition is satisfied, based on a posture, an angle, a relative position, and the like of the text input device 100 when the user starts a conversation. However, the state information of the text input device included in the context information is not limited thereto.

The user state information is information about a user's characteristics, movement, and life pattern, and the like, and may include information about a user's gender, a user's walking state, exercising state, driving state, and sleeping state, a user's mood state, and the like. For example, when a gesture that the user uses frequently during a voice input is recognized, the text input device 100 may satisfy the voice activation condition with a higher frequency. However, the user state information included in the context information is not limited thereto.

The user's usage history information of the text input device 100 is information about the history of the user using the text input device 100, and may include execution history of the application, the history of functions executed in the application, a user's call history, a user's text history, and the frequency of words included in the text information. For example, the text input device may satisfy the voice activation condition with a higher frequency during a text conversation with a specific user. However, the usage history information included in the context information is not limited thereto.

In determining whether the voice activation condition is satisfied, which context information is to be used may be determined according to learning based on a preset criterion. For example, supervised learning that uses a certain voice input and certain context information as input values and unsupervised learning that discovers a pattern of a voice activation condition by self-learning a type of context information necessary for determining a voice activation condition without separate supervision may be used to determine the voice activation condition. Also, for example, reinforcement learning that uses a feedback on a result of grasping the user's intention according to learning is correct may be used to determine the voice activation condition.

In an embodiment, the processor 110 may determine whether the voice activation condition is satisfied by combining the above-described embodiments in parallel or in combination.

The processor 110 may activate the voice input interface 130 for recognizing the voice input, based on a result of determining whether the voice activation condition is satisfied. The processor 110 may simultaneously provide the voice input interface 130 and the script input interface 120.

The processor 110 generates voice text information based on the voice input recognized by using the voice input interface 130. Also, the processor 110 generates script text information based on the script input recognized by using the script input interface 120. The processor 110 may generate text information by combining the voice text information with the script text information.

The processor 110 may control a display (not illustrated) of the text input device 100 such that the generated text information is displayed thereon. In order to display the text information, the processor 110 may display the script text information and the voice text information in the order of generation.

The processor 110 may determine whether the voice deactivation condition is satisfied. The voice deactivation condition may be a result of determining the intention of the user 10 to end providing the voice input.

In an embodiment, the processor 110 may determine whether the voice deactivation condition is satisfied, based on context information. Alternatively, the processor 110 may determine whether the voice deactivation condition is satisfied, based on sound information received by using a microphone, a slope of the text input device 100, a distance from a user's face, and a determination of a user's lip movement. For example, the processor 110 may determine whether the voice deactivation condition is satisfied, based on whether the slope of the text input device 100 is a slope unsuitable for user face recognition. Also, the processor 110 may determine the voice deactivation condition based on an element used to determine whether the voice activation condition is satisfied. However, the operation, performed by the processor 110, of determining the voice deactivation condition is not limited to the above-described embodiments.

The processor 110 may deactivate the voice input interface 130 based on a result of determining whether the voice deactivation condition is satisfied. The text input device 100 may simultaneously provide the script input interface 120 and the voice input interface 130 and control whether to activate the voice input interface 130 automatically or according to the user's selection, based on the voice activation condition or the voice deactivation condition. Thus, the text input operation may be efficiently performed.

Examples of the text input device 100 may include smartphones, tablet personal computers (PCs), PCs, smart televisions (TVs), mobile phones, personal digital assistants (PDAs), laptop computers, media players, micro servers, global positioning system (GPS) devices, e-book terminals, digital broadcasting terminals, navigations, kiosk, MP3 players, digital cameras, home appliances, and other mobile or non-mobile computing devices, but the present disclosure is not limited thereto. Also, examples of the text input device 100 may include wearable devices, such as watches, glasses, hair bands, or rings, which have a communication function and a data processing function. However, the present disclosure is not limited thereto, and the text input device 100 may include any types of devices capable of receiving a user input and providing text based thereon.

Also, the text input device 100 may communicate with a server and other devices (not illustrated) via a certain network in order to use various pieces of context information. In this case, the network may include a local area network (LAN), a wide area network (WAN), a value added network (VAN), a mobile radio communication network, a satellite communication network, or any combinations thereof. The network may be a comprehensive data communication network that enables network configuration entities to efficiently communicate with each other and may include a wired Internet, a wireless Internet, and a mobile wireless communication network. Examples of the wireless communication may include wireless LAN (Wi-Fi), Bluetooth, Bluetooth Low Energy, Zigbee, Wi-Fi Direct (WFD), ultra wideband (UWB), Infrared Data Association (IrDA), and Near Field Communication (NFC), but the present disclosure is not limited thereto.

Figure 2:
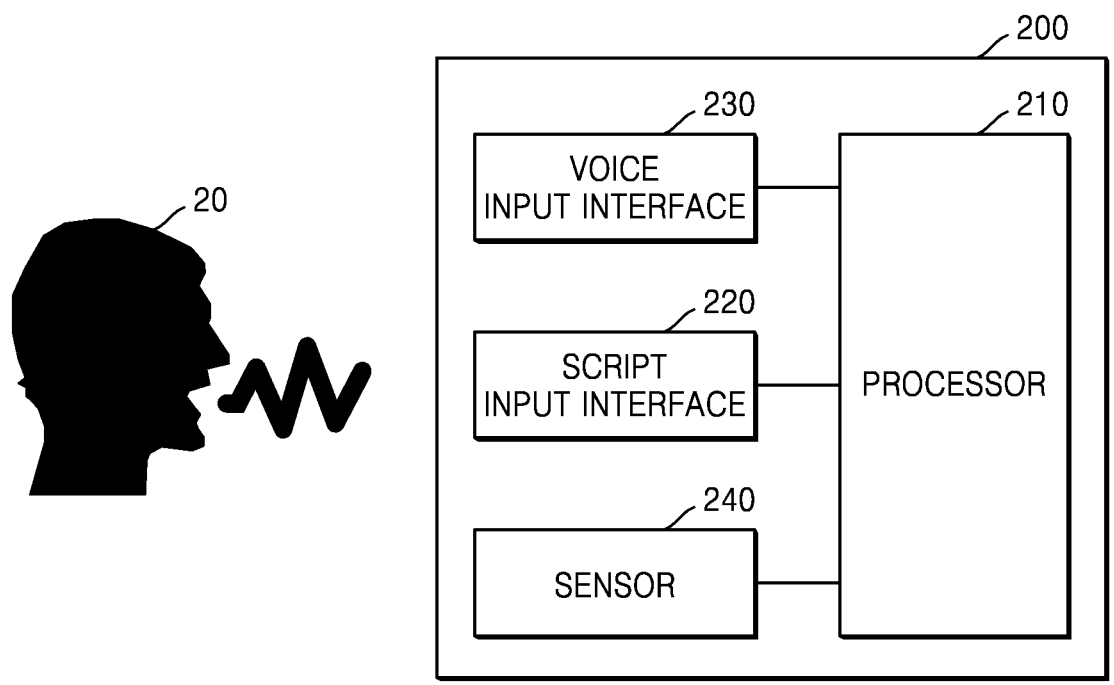
FIG. 2 is a diagram of a text input device according to an embodiment.

FIG. 2 is a diagram of a text input device according to an embodiment.

Referring to FIG. 2, a text input device 200 includes a processor 210, a script input interface 220, a voice input interface 230, and a sensor 240.

The processor 210 controls overall operations of the text input device 200.

The text input device 200 may receive a script input by using the script input interface 220 and may receive a voice input by using the voice input interface 230. The text input device 200 may simultaneously provide the script input interface 220 and the voice input interface 230.

The sensor 240 includes at least one sensor that receives information from the outside. In an embodiment, the sensor 240 may include a microphone that receives sound information. In an embodiment, the sensor 240 may include an accelerometer or a gyroscope that detects movement of the text input device 200. In an embodiment, the sensor 240 may include a camera that receives image information. In an embodiment, the sensor 240 may include a temperature sensor or a humidity sensor that receives surrounding environment information. However, this is an example, and the type of sensor included in the sensor 240 is not limited thereto. The sensor 240 may provide the received information to the processor 210. The processor 210 may determine whether a voice activation condition is satisfied, based on the provided information.

Figure 3:
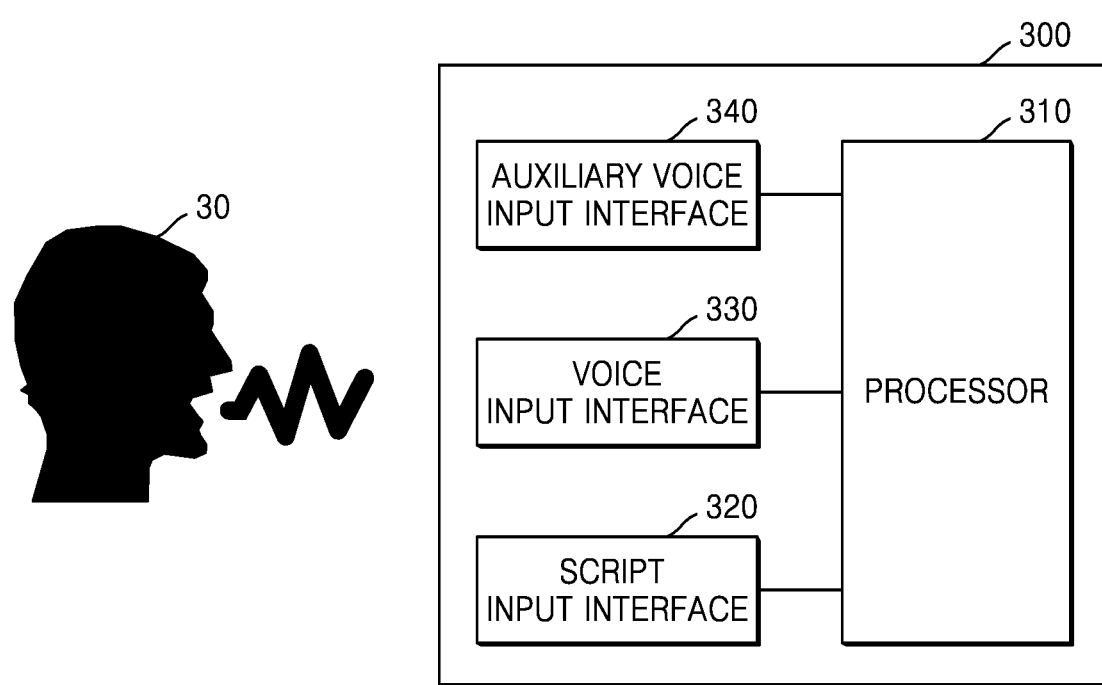
FIG. 3 is a diagram of a text input device according to an embodiment.

FIG. 3 is a diagram of a text input device according to an embodiment.

Referring to FIG. 3, a text input device 300 includes a processor 310, a script input interface 320, a voice input interface 330, and an auxiliary voice input interface 340.

A user 30 may provide a voice input or a script input to the text input device 300. The voice input is a user's voice including information, for example, text information. The script input is a user's action including information, for example, text information. The user's action may include a contact with the device.

The processor 310 may control the script input interface 320 and the voice input interface 330 such that the script input is input by using the script input interface 320 and the voice input is input by using the voice input interface 330.

The processor 310 may determine whether a voice activation condition and a voice deactivation condition are satisfied. The processor 310 may automatically activate or deactivate the voice input interface 330 based on a result of determining whether the voice activation condition or the voice deactivation condition is satisfied.

The processor 310 may generate recommended voice text information from the voice input recognized by using the voice input interface 330, based on context information. The processor 310 may provide the recommended voice text information to a user by using the auxiliary voice input interface 340. The recommended voice text information is text information expected to be input by the user, based on the voice input and the context information.

The context information may include at least one of surrounding environment information of the text input device 300, state information of the text input device 300, user state information, user's usage history information of the text input device 300, and user schedule information, but the present disclosure is not limited thereto.

In generating the recommended voice text information, which context information is to be used may be determined according to learning based on a preset criterion. For example, supervised learning that uses a certain voice input and certain context information as input values and unsupervised learning that discovers a pattern of recommended voice text information by self-learning a type of context information necessary for the recommended voice text information without separate supervision may be used to generate the recommended voice text information. Also, for example, reinforcement learning that uses a feedback on whether a result of grasping the user's intention according to learning is correct may be used to generate the recommended voice text information.

The processor 310 may receive a user input of selecting one of pieces of the provided recommended voice text information as voice text information by using the auxiliary voice input interface 340. Also, the processor 310 may generate script text information based on the script input recognized by using the script input interface 320. The processor 310 may generate text information by combining the selected voice text information with the script text information.

The processor 310 may control a display (not illustrated) such that the generated text information is displayed thereon. In order to display the text information, the processor 310 may display the script text information and the voice text information in the order of generation.

Figure 4A:
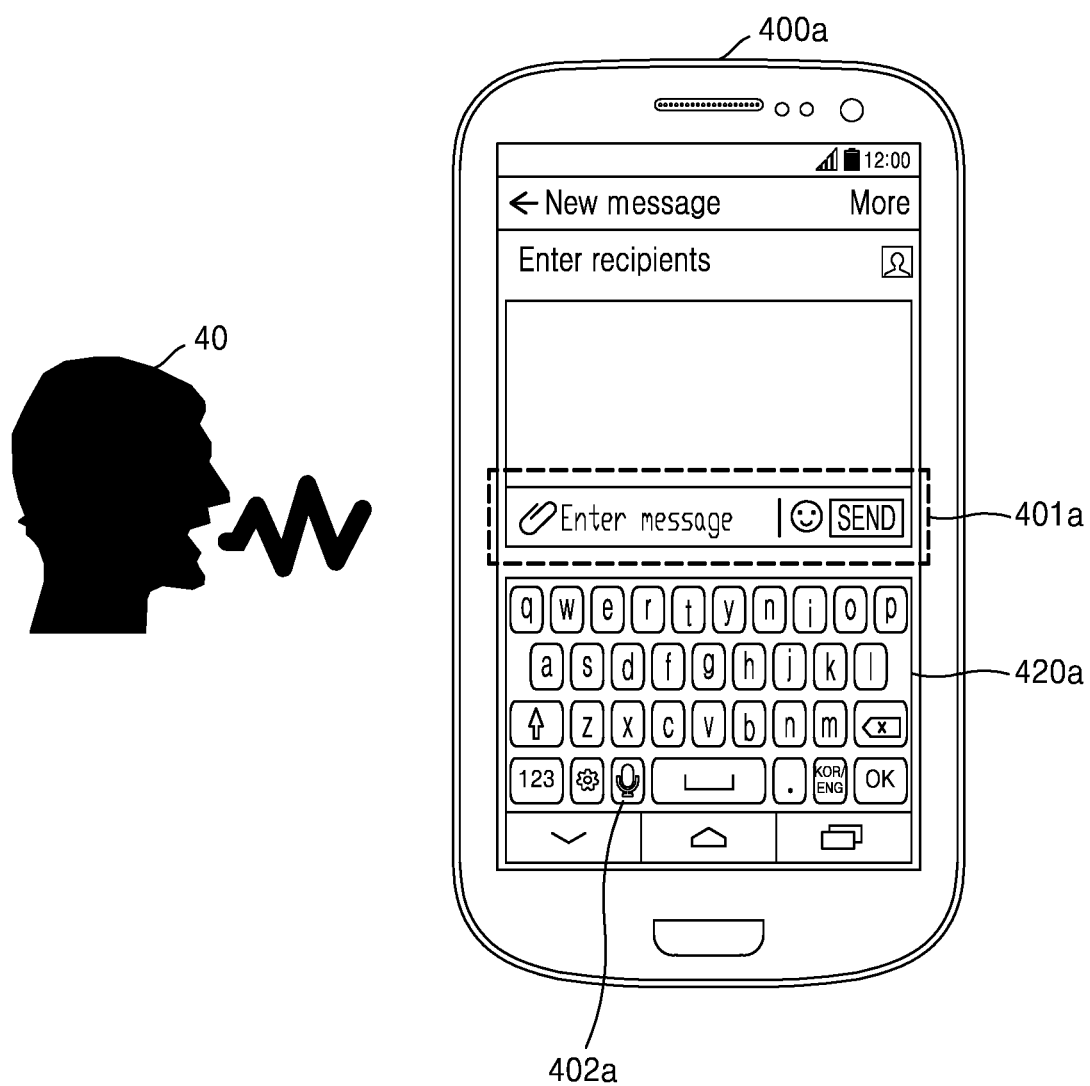
FIG. 4A is a diagram for describing a method, performed by a text input device, of performing a text input operation, according to some embodiments.

FIG. 4A is a diagram for describing a method, performed by a text input device 400a, of performing a text input operation, according to some embodiments.

Referring to FIG. 4A, the text input device 400a includes a script input interface 420a and a voice input interface (not illustrated). A user 40 may provide a voice input or a script input to the text input device 400a.

The text input device 400a may receive the script input by using the script input interface 420a and may receive the voice input by using the voice input interface. The text input device 400a may generate voice text information based on the voice input recognized by using the voice input interface and may generate script text information based on the script input recognized by using the script input interface 420a. The text input device 400a may generate text information by combining the voice text information with the script text information.

In FIG. 4A, the script input interface 420a is displayed in the form of a QWERTY keyboard UI, but this is an example. The form of the script input interface 420a according to the present embodiment is not limited to the aforementioned keyboard UI. Also, although the voice input interface is not illustrated in FIG. 4A, this is an example. The script input interface 420a may be displayed on the text input device 400a in the form of a UI.

The text input device 400a may provide the script input interface 420a when a text input request is detected. For example, the text input device 400a may provide the script input interface 420a when a user input of requesting a UI for text input is detected. Alternatively, the text input device 400a may provide the script input interface in response to a request from an application executed in the text input device 400a.

When the text input device 400a provides the script input interface 420a, the text input device 400a may set a text display area 401a that is a preset area for displaying text information. For example, when a search application is executed, a search window may be included in the text display area 401a.

As described above, the text input device 400a may generate script text information based on the script input recognized by using the script input interface 320. The script input may include a text of at least one of characters, numbers, and symbols. The text input device 400a may display the generated script text information on the text display area 401a.

The text input device 400a may determine whether a voice activation condition, which is a result of determining the intention of the user to provide the voice input, is satisfied. In an embodiment, the text input device 400a may determine whether the voice activation condition is satisfied, based on a combination of the presence or absence of script input, sound information received by using a microphone, a slope of the text input device 400a, a distance from a user's face, and a user's lip movement. However, the method of determining the voice activation condition is not limited to the above-described embodiments.

The text input device 400a may provide the voice input interface for recognizing the voice input together with the script input interface 420a, based on the determined voice activation condition.

In an embodiment, the text input device 400a may display a state of the voice input interface, that is, whether activated or deactivated, while the voice input interface is provided. For example, the text input device 400a may change a color of a voice input activation icon 402a displayed on the text input device 400a, based on the state of the voice input interface. The voice input activation icon 402a may be located on the script input interface 420a. However, the method of displaying the state of the voice input interface while the voice input interface is provided is not limited to the above-described embodiments.

As described above, the text input device 400a may generate voice text information based on the voice input recognized by using the voice input interface. The text input device 400a may display the generated voice text information on the text display area 401a.

In an embodiment, when a voice input interface is provided together with the script input interface, the text input device 400a may display, on the text display area 401a, the voice text information or the script text information generated based on the voice input or the script input.

In an embodiment, the text input device 400a may display the voice text information or the script text information on the text display area 401a in the order of input. When the inputs are performed at the same time, the text input device 400a may determine a display order of voice text information or script text information according to a pre-designated priority flag. The priority flag according to the embodiment may be designated by the user or may be pre-designated and stored in a memory (not illustrated).

Figure 4B:
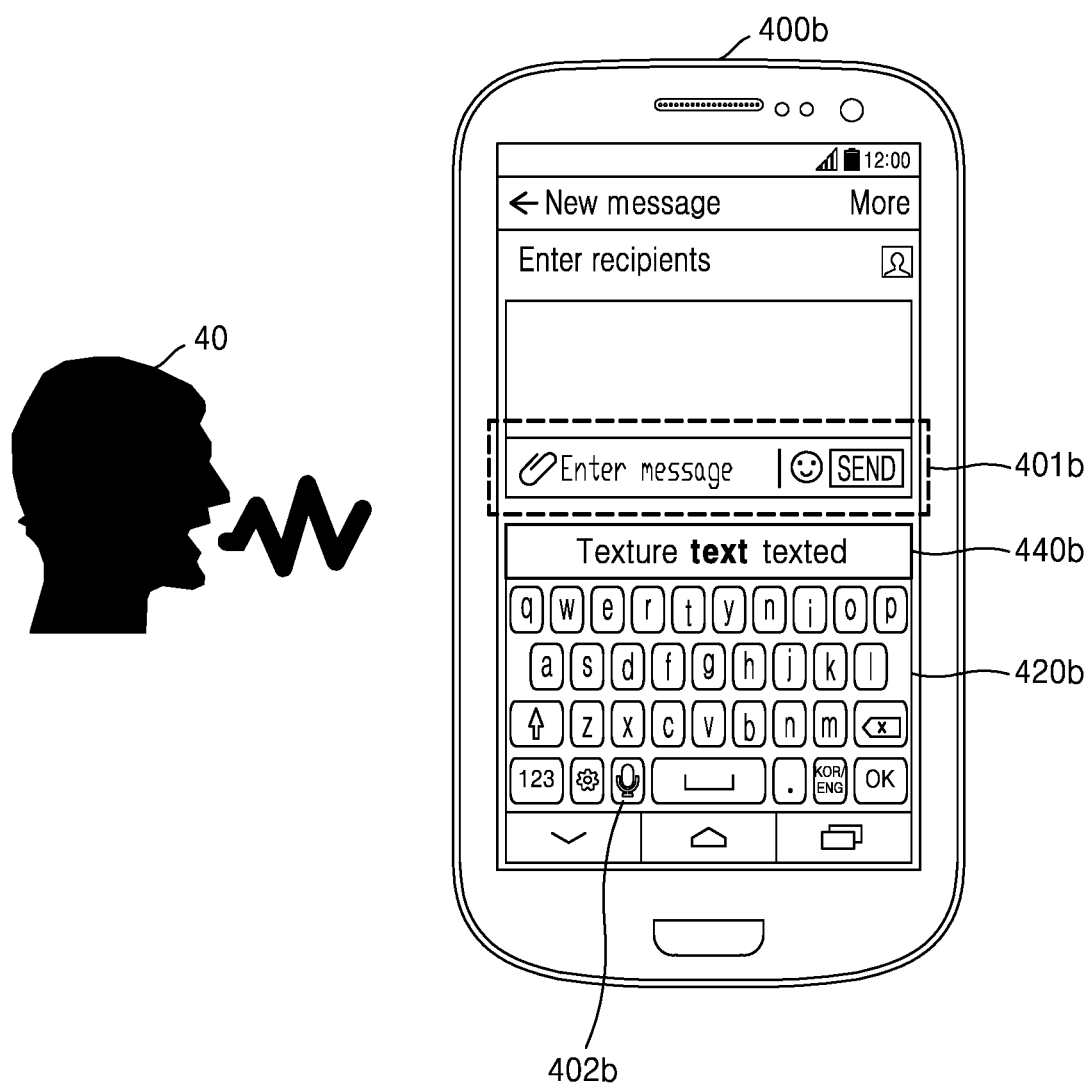
FIG. 4B is a diagram for describing a method, performed by a text input device, of performing a text input operation, according to some embodiments.

FIG. 4B is a diagram for describing a method, performed by a text input device 400b, of performing a text input operation, according to some embodiments.

Referring to FIG. 4B, the text input device 400b includes a script input interface 420b, a voice input interface (not illustrated), and an auxiliary voice input interface 440b. A user 40 may provide a voice input or a script input to the text input device 400b.

The text input device 400b may receive the script input by using the script input interface 420b and may receive the voice input by using the voice input interface.

In FIG. 4B, the script input interface 420b is displayed in the form of a QWERTY keyboard UI, but this is an example. The form of the script input interface 420b according to the present embodiment is not limited to the aforementioned keyboard UI. Also, although the voice input interface is not illustrated in FIG. 4B, this is an example. The voice input interface may be displayed on the text input device 400b in the form of a UI.

The text input device 400b provides the script input interface 420b when a text input request is detected. When the text input device 400b provides the script input interface 420b, the text input device 400b may set a text display area 401b that is a preset area for displaying text information.

The text input device 400b may generate script text information based on the script input recognized by using the script input interface 420b. The text input device 400b may display the generated script text information on the text display area 401b.

The text input device 400b may determine whether a voice activation condition, which is a result of determining the intention of the user to provide the voice input, is satisfied. In an embodiment, the text input device 400b may determine whether the voice activation condition is satisfied, based on a combination of the presence or absence of script input, sound information received by using a microphone, a slope of the text input device 400b, a distance from a user's face, and a user's lip movement. However, the method of determining the voice activation condition is not limited to the above-described embodiments.

The text input device 400b may provide the voice input interface for recognizing the voice input together with the script input interface 420b, based on the determined voice activation condition.

In an embodiment, the text input device 400b may display a state of the voice input interface, that is, whether activated or deactivated, while the voice input interface is provided. For example, the text input device 400b may change a color of a voice input activation icon 402*b* displayed on the text input device 400*b*, based on the state of the voice input interface. However, the method of displaying the state of the voice input interface while the voice input interface is provided is not limited to the above-described embodiments.

The text input device 400*b* may generate recommended voice text information from the voice input received by using the voice input interface, based on context information. The recommended voice text information is text information expected to be input by the user, based on the voice input and the context information. For example, when the text input device 400*b* determines that text information "text" is included in the voice input, the text input device 400*b* may generate "texture," "text," and "texted" as the recommended voice text information.

The text input device 400*b* may provide the recommended voice text information to the user by using the auxiliary voice input interface 440*b*. Also, the text input device 400*b* may receive a user input of selecting one of pieces of the provided recommended voice text information as voice text information by using the auxiliary voice input interface 440*b*.

The text input device 400*b* may display the selected voice text information on the text display area 401*b*.

More specifically, when a voice input interface is provided together with the script input interface, the text input device 400*b* may display, on the text display area 401*b*, the voice text information or the script text information generated based on the voice input or the script input.

In an embodiment, the text input device 400*b* may display the voice text information or the script text information on the text display area 401*b* in the order of input. When the inputs are performed at the same time, the text input device 400*b* may determine a display order of voice text information or script text information according to a pre-designated priority flag. The priority flag according to the embodiment may be designated by the user or may be pre-designated and stored in a memory (not illustrated).

Figure 5:
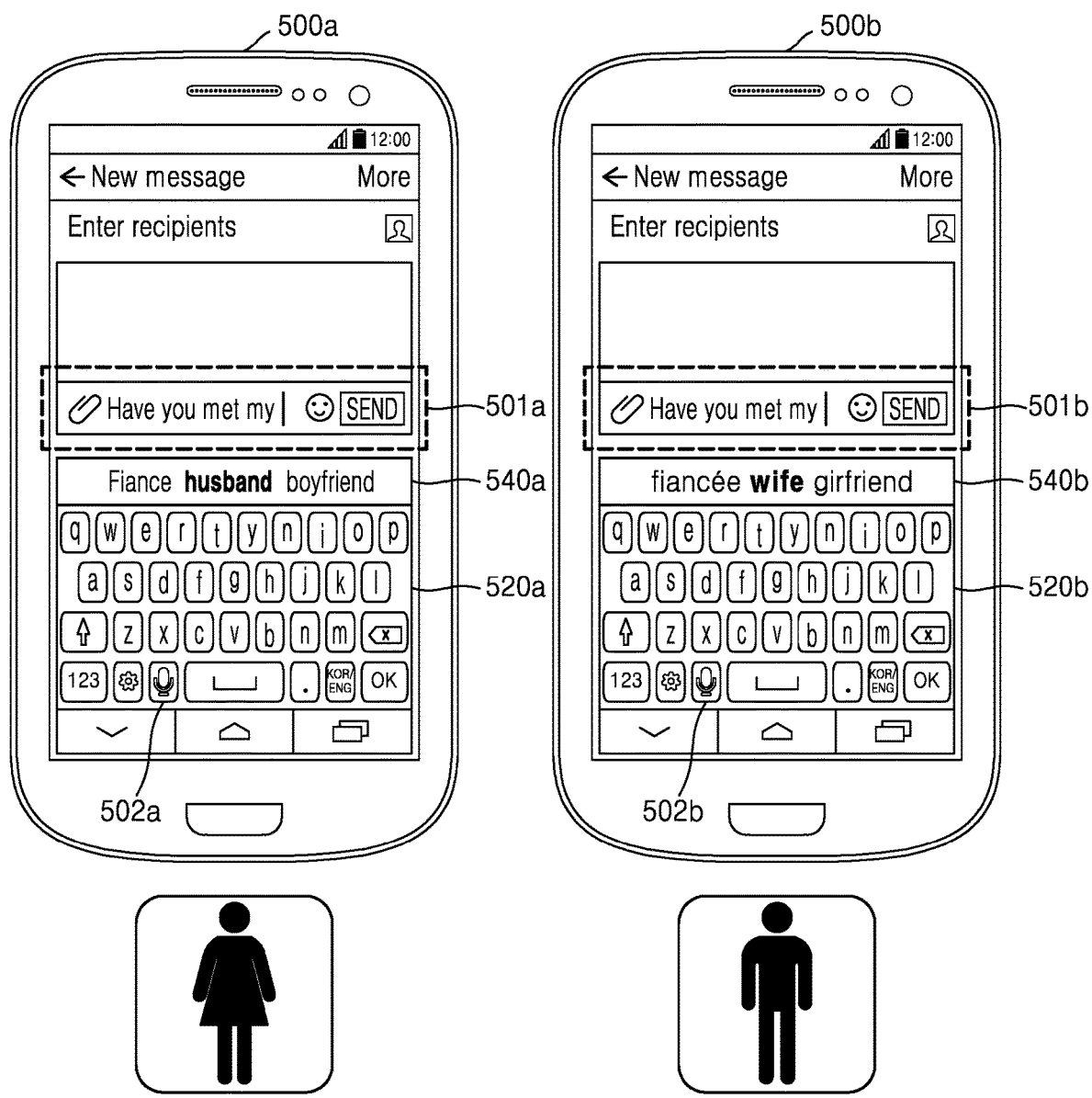
FIG. 5 is a diagram for describing a method, performed by a text input device, of performing a text input operation based on context information, according to some embodiments.

FIG. 5 is a diagram for describing a method, performed by a text input device, of performing a text input operation based on context information, according to some embodiments.

Referring to FIG. 5, text input devices 500*a* and 500*b* include script input interfaces 520*a* and 520*b*, voice input interfaces (not illustrated), and auxiliary voice input interfaces 540*a* and 540*b*, respectively. A user may provide voice inputs or script inputs to the text input devices 500*a* and 500*b*.

The text input devices 500*a* and 500*b* may receive the script inputs by using the script input interfaces 520*a* and 520*b*, respectively, and may receive the voice inputs by using the voice input interfaces, respectively. When the text input devices 500*a* and 500*b* provide the script input interfaces 520*a* and 520*b*, respectively, the text input devices 500*a* and 500*b* may set text display areas 501*a* and 501*b* that are a preset area for displaying text information, respectively.

The text input devices 500*a* and 500*b* may determine whether a voice activation condition, which is a result of determining the intention of the user to provide the voice input, is satisfied. In an embodiment, the text input devices 500*a* and 500*b* may determine whether the voice activation condition is satisfied, based on a combination of the presence or absence of script input, sound information received by using a microphone, slopes of the text input devices 500*a* and 500*b*, a distance from a user's face, and a user's lip movement. However, the method of determining the voice activation condition is not limited to the above-described embodiments.

The text input devices 500*a* and 500*b* may provide the voice input interfaces for recognizing the voice inputs together with the script input interfaces 520*a* and 520*b*, based on the determined voice activation condition, respectively.

The text input devices 500*a* and 500*b* may generate recommended voice text information from the voice inputs received by using the voice input interfaces, based on context information, respectively. The recommended voice text information is text information expected to be input by the user, based on the voice input and the context information.

In an embodiment, the context information includes gender information of the user. In an embodiment, the gender information of the user may be determined from the user's voice input, or may be previously stored or learned and determined.

Referring to FIG. 5, when the gender of the user included in the context information is female, the text input device 500*a* may generate "fiancee," "husband," and "boyfriend" as recommended voice text information. When the gender of the user included in the context information is male, the text input device 500*b* may generate "fiancee," "wife," and "girlfriend" as recommended voice text information. Each word disclosed in FIG. 5 is an example, and the methods, performed by the text input devices 500*a* and 500*b*, of generating the recommended voice text information based on the gender information are not limited thereto.

Figure 6:
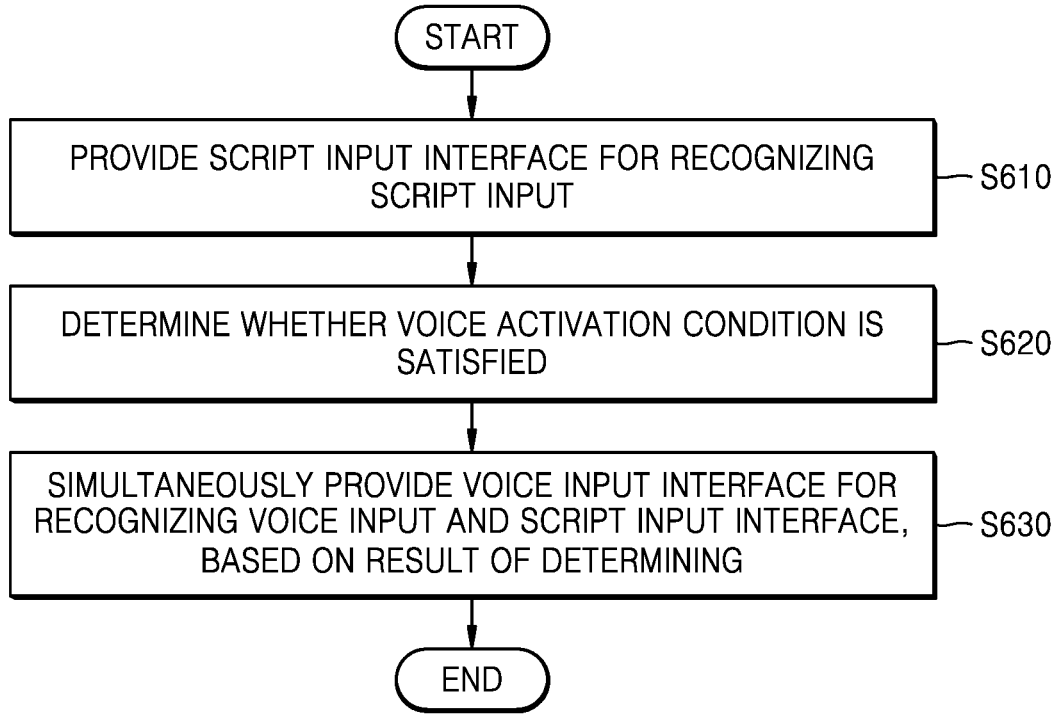
FIG. 6 is a flowchart for describing a text input method according to an embodiment.

FIG. 6 is a flowchart for describing a text input method according to an embodiment.

In operation S610, a text input device provides a script input interface for receiving a script input. The script input is a user's action including information, for example, text information. The user's action may include a contact with the device. The script input interface may include a keyboard UI on which characters, numbers, and symbols are displayed. In an embodiment, the text input device may provide the script input interface when a user input of requesting an interface for text input is detected.

In operation S620, the text input device determines whether a voice activation condition is satisfied. The voice activation condition may be a result of determining the intention of the user to provide the voice input. In an embodiment, the text input device may determine whether the voice activation condition is satisfied, based on a combination of the presence or absence of script input, sound information received by using a microphone, a slope of the text input device, a distance from a user's face, and a user's lip movement. Alternatively, when the script input interface is provided, the text input device may automatically determine that the voice activation condition is satisfied. However, the method of determining the voice activation condition is not limited to the above-described embodiments.

In operation S630, the text input device provides a voice input interface for recognizing voice input together with the script input interface, based on the determined voice activation condition. For example, when the user's voice is included in the sound information received by using the microphone and the voice activation condition is satisfied, the text input device may provide the voice input interface together with the script input interface when the user's voice is present. Alternatively, when the script input interface is provided and the voice activation condition is satisfied, the text input device may automatically provide the script input interface and the voice input interface at the same time at any time. That is, when the voice activation condition is satisfied, the text input device may activate the voice input interface to provide the user with a text input using both the voice input and the script input.

Figure 7:
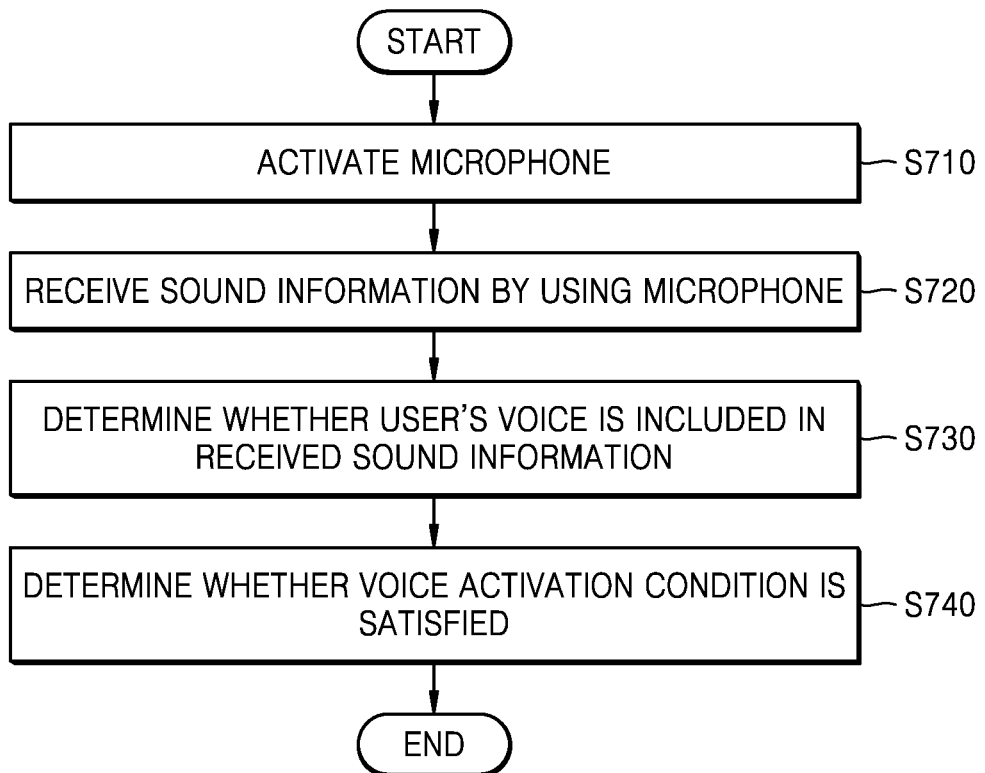
FIG. 7 is a flowchart for describing a method of determining a voice activation condition, according to an embodiment.

FIG. 7 is a flowchart for describing a method of determining a voice activation condition, according to an embodiment.

In operation S710, a text input device activates a microphone. The text input device may activate the microphone when a preset condition is satisfied. For example, the text input device may activate the microphone when a script input is present. In an embodiment, when a script input that is input via the script input interface within a certain time is present, the text input device may determine that the script input is present.

In operation S720, the text input device receives sound information by using the microphone. The sound information is auditory information around the text input device, which is received by using the microphone.

In operation S730, the text input device determines whether a user's voice is included in the received sound information. The method, performed by the text input device, of determining whether the user's voice is included may be performed based on various algorithms. Also, the text input device may perform noise cancellation and various signal processing operations in order to determine whether the user's voice is included.

In operation S740, the text input device determines whether the voice activation condition is satisfied, based on whether the user's voice is included. When the user's voice is recognized, the text input device may determine that the voice activation condition has been satisfied, and provide the user with a text input via voice.

Figure 8:
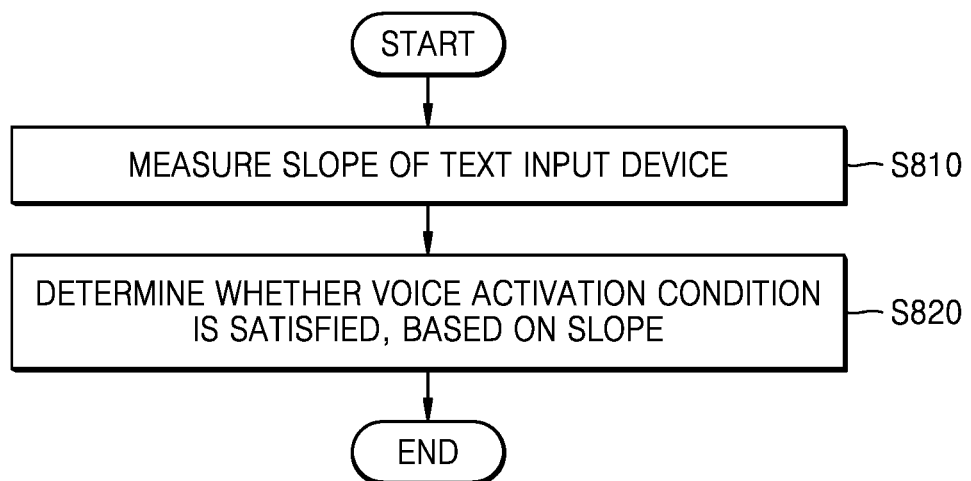
FIG. 8 is a flowchart for describing a method of determining a voice activation condition, according to an embodiment.

FIG. 8 is a flowchart for describing a method of determining a voice activation condition, according to an embodiment.

In operation S810, the text input device measures a slope of the text input device. In an embodiment, the text input device may measure the slope of the text input device by using an accelerometer or a gyroscope. In an embodiment, the text input device may perform a slope measuring operation when a preset condition is satisfied. For example, the text input device may measure the slope when a script input is present. In an embodiment, when a script input that is input via the script input interface within a certain time is present, the text input device may determine that the script input is present.

In operation S820, the text input device determines whether the voice activation condition is satisfied, based on the measured slope. In an embodiment, the text input device may determine whether the voice activation condition is satisfied by comparing the measured slope with a threshold value. Alternatively, the text input device may determine whether the voice activation condition is satisfied, based on whether the measured slope is a slope suitable for user face recognition. However, the operation of determining the voice activation condition based on the slope of the text input device is not limited to the above-described embodiments.

Figure 9:
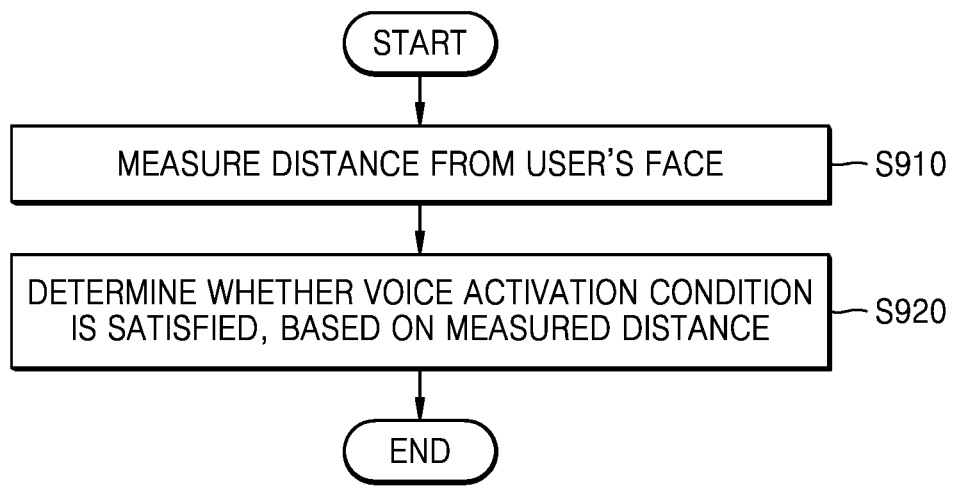
FIG. 9 is a flowchart for describing a method of determining a voice activation condition, according to an embodiment.

FIG. 9 is a flowchart for describing a method of determining a voice activation condition, according to an embodiment.

In operation S910, the text input device measures a distance from a user's face to the text input device. In an embodiment, the text input device may measure the aforementioned distance by using a camera on the user side, for example, a front camera. In an embodiment, the text input device may activate the camera when a preset condition is satisfied. For example, the text input device may activate the camera when a script input is present. Alternatively, the text input device may activate the camera when the slope of the text input device satisfies a certain condition. However, the camera activating operation and the distance measuring operation of the text input device are not limited to the above-described embodiments.

In operation S920, the text input device determines whether the voice activation condition is satisfied, based on the measured distance. In an embodiment, the text input device may determine whether the voice activation condition is satisfied by comparing the measured distance with a threshold value. Alternatively, the text input device may determine whether the voice activation condition is satisfied, based on whether the measured distance is a distance suitable for user face recognition. However, the operation, performed by the text input device, of determining the voice activation condition based on the distance is not limited to the above-described embodiments.

Figure 10:
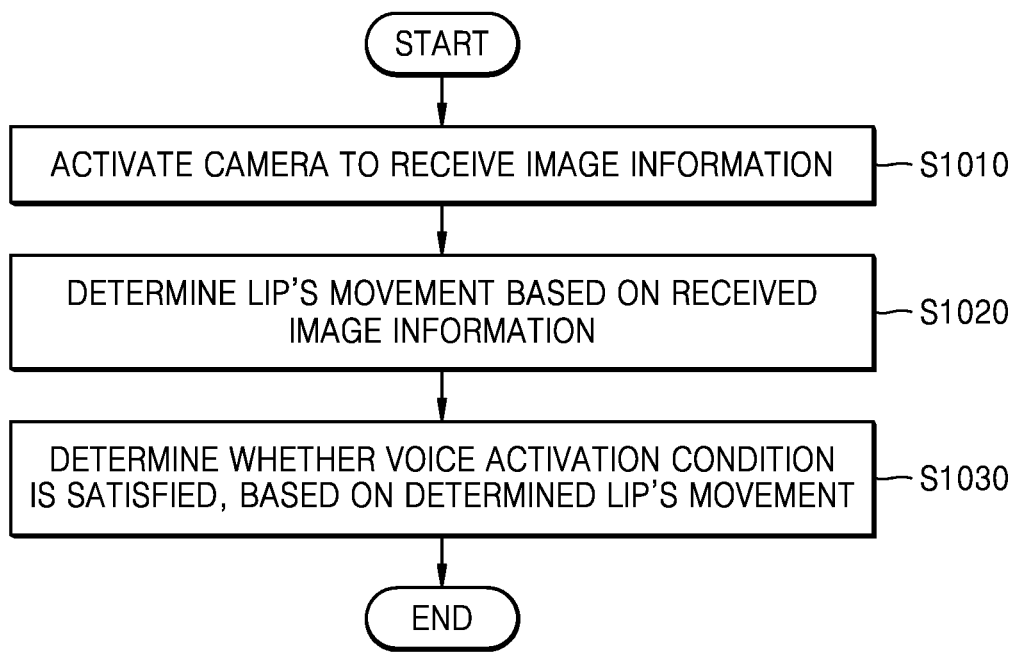
FIG. 10 is a flowchart for describing a method of determining a voice activation condition, according to an embodiment.

FIG. 10 is a flowchart for describing a method of determining a voice activation condition, according to an embodiment.

In operation S1010, the text input device activates a camera to receive image information. In an embodiment, the text input device may activate a camera on the user side, for example, a front camera. In an embodiment, the text input device may activate the camera when a preset condition is satisfied. For example, the text input device may activate the camera when a script input is present. Alternatively, the text input device may activate the camera when the slope of the text input device satisfies a certain condition. However, the camera activating operation and the distance measuring operation of the text input device are not limited to the above-described embodiments.

In operation S1020, the text input device determines a user's lip movement based on the received image information. In an embodiment, the text input device may recognize a user's face from the image information.

In operation S1030, the text input device determines whether a voice activation condition is satisfied, based on the determined lip movement. In an embodiment, the text input device may determine whether the voice activation condition is satisfied, based on whether the lip movement is present. Alternatively, the text input device may determine whether the voice activation condition is satisfied, based on whether the determined lip movement includes text information. However, the operation, performed by the text input device, of determining the voice activation condition based on the lip movement is not limited to the above-described embodiments.

Figure 11:
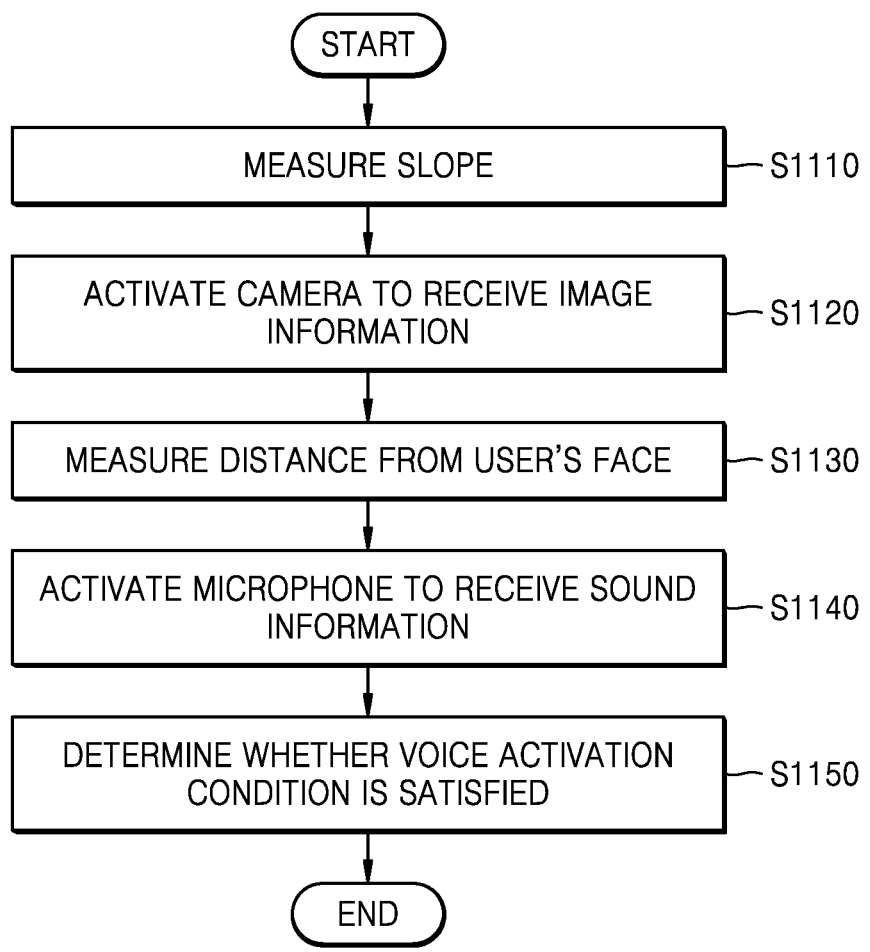
FIG. 11 is a flowchart for describing a method of determining a voice activation condition, according to an embodiment.

FIG. 11 is a flowchart for describing a method of determining a voice activation condition, according to an embodiment.

In operation S1110, a text input device measures a slope of the text input device. In an embodiment, the text input device may measure the slope of the text input device by using an accelerometer or a gyroscope. For example, the text input device may perform a slope measuring operation when a preset condition is satisfied.

In operation S1120, the text input device activates a camera to receive image information. In an embodiment, the text input device may receive the image information by using a camera on the user side, for example, a front camera. In an embodiment, the text input device may activate the camera when a preset condition is satisfied. For example, the text input device may activate the camera when a script input is present. Alternatively, the text input device may activate the camera when the slope of the text input device satisfies a certain condition.

In operation S1130, the text input device measures a distance from a user's face to the text input device. In an embodiment, the text input device may measure the aforementioned distance based on the image information received by using the camera.

In operation S1140, the text input device activates a microphone to receive sound information. The text input device may activate the microphone when a preset condition is satisfied. For example, the text input device may activate the microphone together when the camera is activated. Alternatively, the text input device may activate the microphone when a distance between the text input device and the user's face satisfies a certain condition.

In operation S1150, the text input device determines whether a voice activation condition is satisfied. For example, when the user's voice is recognized from the sound information received by using the microphone, the text input device may determine that the voice activation condition has been satisfied. Alternatively, when the user's lip movement is recognized from the image information received by using the camera, the text input device may determine that the voice activation condition has been satisfied. Alternatively, when the user's voice is recognized from the sound information and the user's lip movement is recognized from the image information received by using the camera, the text input device may determine that the voice activation condition has been satisfied. The text input device may determine whether the voice activation condition is satisfied by using sensing operations of various sensors, and provide the user with a text input via voice.

Figure 12:
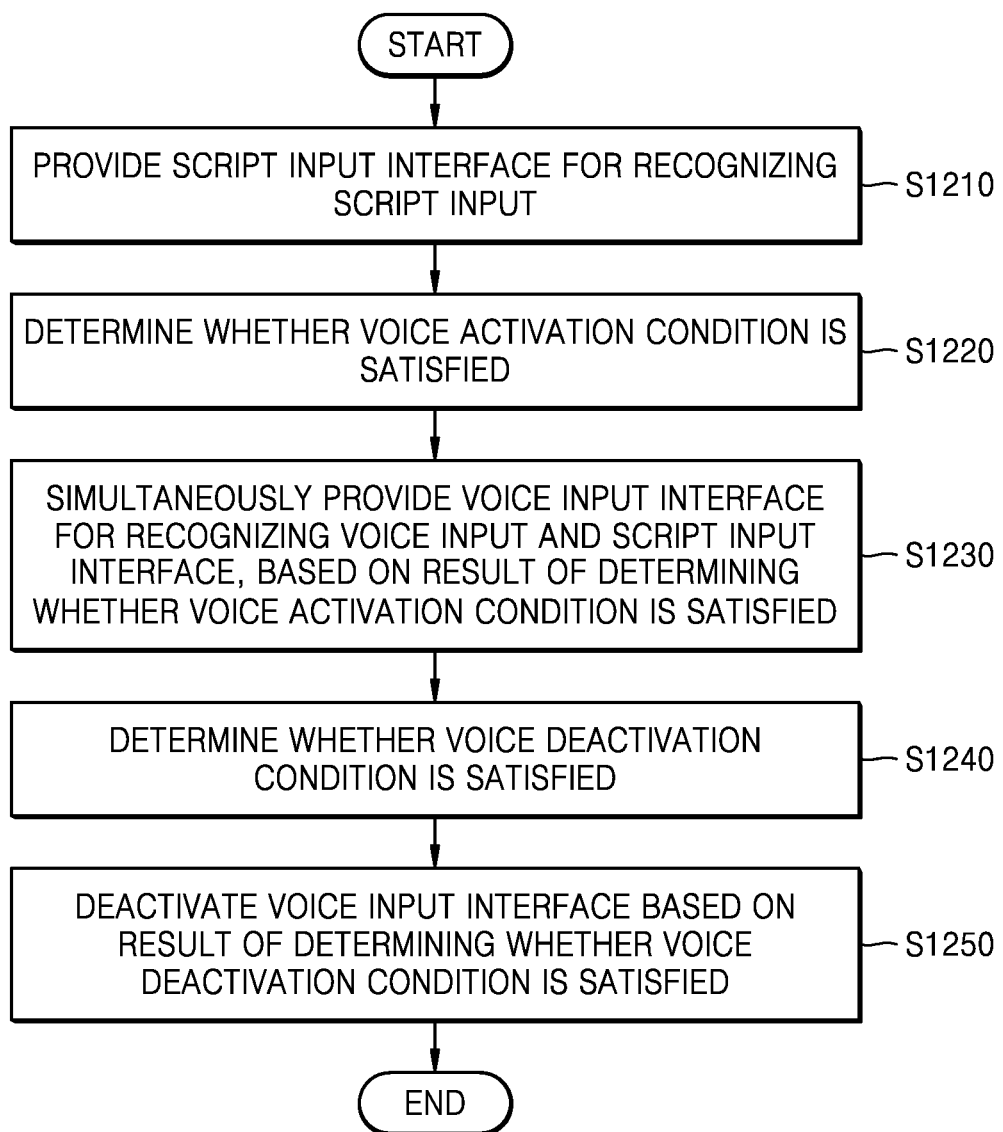
FIG. 12 is a flowchart for describing a text input method according to an embodiment.

FIG. 12 is a flowchart for describing a text input method according to an embodiment.

In operation S1210, a text input device provides a script input interface for recognizing a script input. In an embodiment, the text input device may provide the script input interface when a user input of requesting an interface for text input is detected.

In operation S1220, the text input device determines whether a voice activation condition is satisfied. In an embodiment, the text input device may determine whether the voice activation condition is satisfied, based on a combination of the presence or absence of script input, sound information received by using a microphone, a slope of the text input device, a distance from a user's face, and a user's lip movement.

In operation S1230, the text input device simultaneously provides a voice input interface for recognizing voice input and a script input interface, based on a result of determining whether the voice activation condition is satisfied.

In operation S1240, the text input device determines whether a voice deactivation condition is satisfied. The voice deactivation condition is a result of determining the intention of the user to end providing the voice input. In an embodiment, the text input device may determine whether the voice deactivation condition is satisfied, based on sound information received by using a microphone, a slope of the text input device, a distance from a user's face, a user's lip movement, and the like. For example, the text input device may determine whether the voice deactivation condition is satisfied, based on whether the slope of the text input device is a slope unsuitable for user face recognition. Also, the text input device may determine the voice deactivation condition based on an element used to determine whether the voice activation condition is satisfied.

In operation S1250, the text input device deactivates the voice input interface, based on whether the voice deactivation condition is satisfied. The text input device may simultaneously provide the script input interface and the voice input interface and control whether to activate the voice input interface automatically or according to the user's selection, based on the voice activation condition or the voice deactivation condition. Thus, the text input operation may be efficiently performed.

Figure 13:
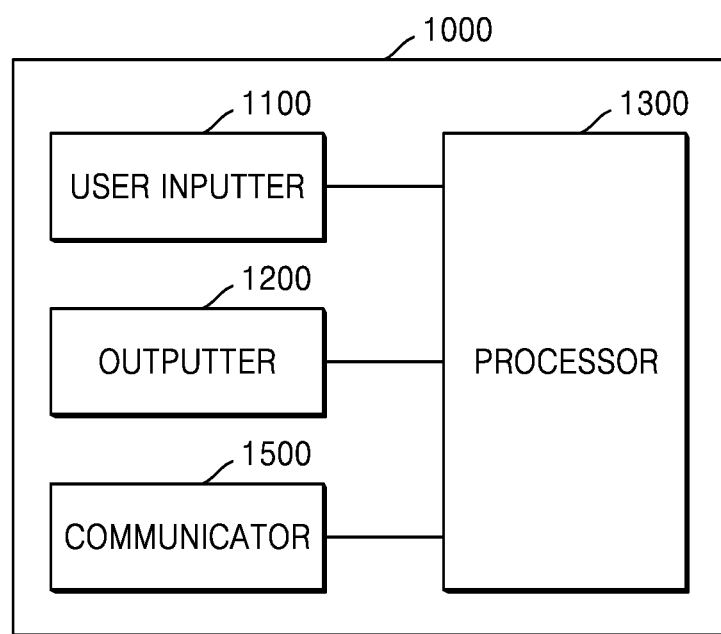
FIG. 13 is a block diagram of a first device according to some embodiments.
Figure 14:
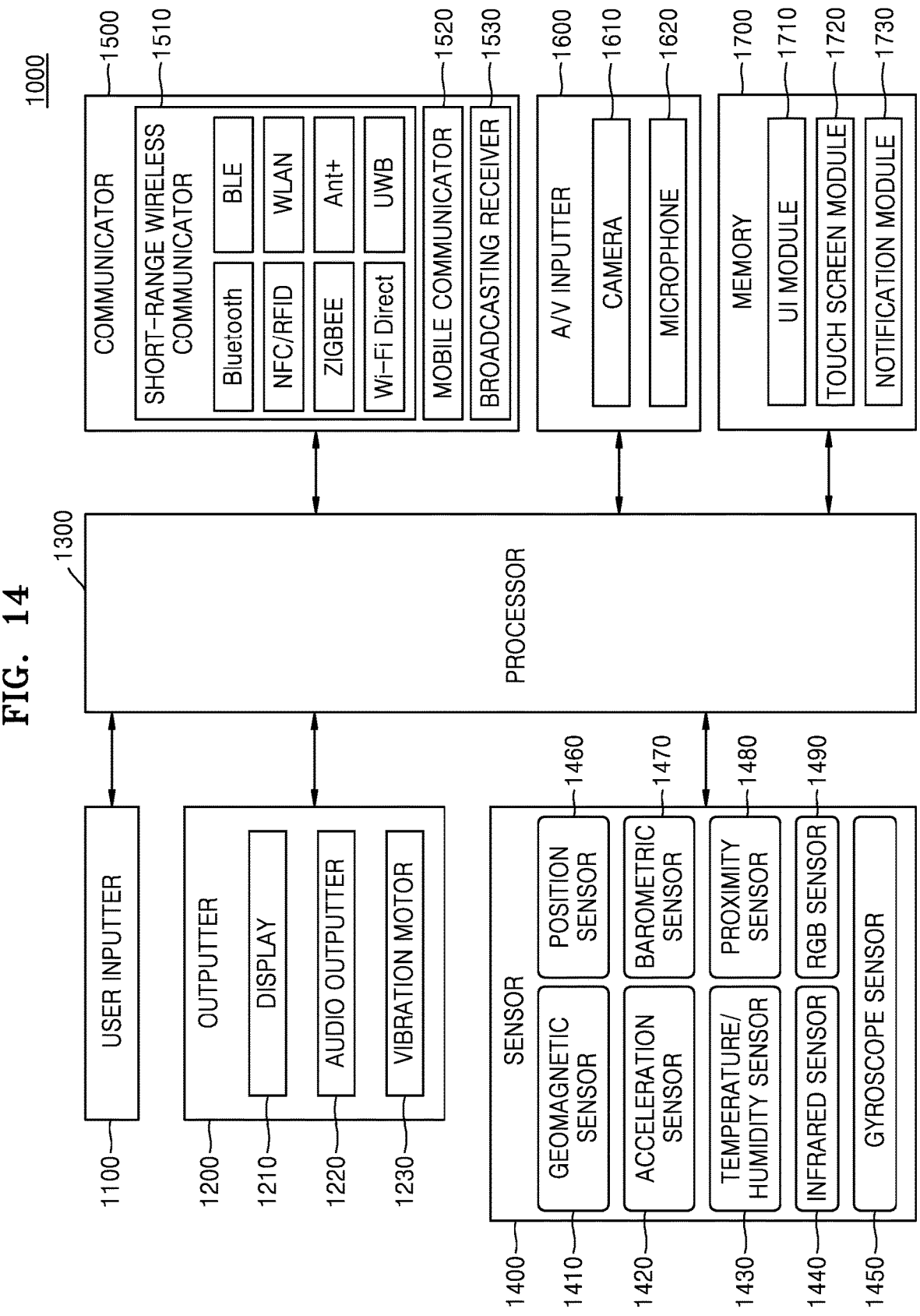
FIG. 14 is a block diagram of a first device according to some embodiments.

FIGS. 13 and 14 are block diagrams of a first device 1000 according to some embodiments.

As illustrated in FIG. 13, the first device 1000 according to some embodiments may include a user inputter 1100, an outputter 1200, a processor 1300, and a communicator 1500. However, all elements illustrated in FIG. 13 are not essential to the first device 1000. The first device 1000 may include more elements than those illustrated in FIG. 13 or may include fewer elements than those illustrated in FIG. 13.

For example, as illustrated in FIG. 14, the first device 1000 according to some embodiments may further include, in addition to the user inputter 1100, the outputter 1200, the processor 1300, and the communicator 1500, a sensor 1400, an audio/video (A/V) inputter 1600, and a memory 1700.

The user inputter 1100 is a device that allows a user to input data for controlling the first device 1000. For example, the user inputter 1100 may include a key pad, a dome switch, a touch pad (e.g., a touch-type capacitive touch pad, a pressure-type resistive touch pad, an infrared beam sensing type touch pad, a surface acoustic wave type touch pad, an integral strain gauge type touch pad, a piezo effect type touch pad, etc.), a jog wheel, and a jog switch, but the present disclosure is not limited thereto.

The user inputter 1100 may include a script input interface and a voice input interface. The user inputter 1100 may receive a voice input or a script input. Also, the user inputter 1100 may receive a user input of selecting one of pieces of recommended voice text information as voice text information.

The outputter 1200 may output an audio signal, a video signal, or a vibration signal. The outputter 1200 may include a display 1210, an audio outputter 1220, and a vibration motor 1230.

The display 1210 displays information processed by the first device 1000. For example, the display 1210 may display the script input interface for receiving the script input or a voice input activation icon indicating whether the voice input interface is activated. Also, the display 1210 may display text information and a text display area that is a preset area for displaying the text information.

When the display 1210 and the touch pad form a layered structure to constitute a touch screen, the display 1210 may also be used as an input device as well as an output device. The display 1210 may include at least one selected from liquid crystal display (LCD), thin-film transistor-liquid crystal display (TFT-LCD), organic light-emitting diode (OLED), flexible display, three-dimensional (3D) display, and electrophoretic display. According to the implementation type of the first device 1000, the first device 1000 may include two or more displays 1210. The two or more displays 1210 may be arranged to face each other by using a hinge.

The audio outputter 1220 outputs audio data that is received from the communicator 1500 or is stored in the memory 1700. Also, the audio outputter 1220 outputs an audio signal associated with the function performed by the first device 1000 (e.g., a call signal reception sound, a message reception sound, a notification sound, etc.). The audio outputter 1220 may include a speaker, a buzzer, and the like.

The vibration motor 1230 may output a vibration signal. For example, the vibration motor 1230 may output a vibration signal corresponding to the output of audio data or video data (e.g., a call signal reception sound, a message reception sound, etc.). Also, the vibration motor 1230 may output a vibration signal when a touch is input to a touch screen.

The processor 1300 controls overall operations of the first device 1000. For example, the processor 1300 may execute programs stored in the memory 1700 to control the user inputter 1100, the outputter 1200, the sensor 1400, the communicator 1500, and the A/V inputter 1600.

Specifically, the processor 1300 may control the user inputter 1100 such that a script input is input by using a script input interface and a voice input is input by using a voice input interface.

The processor 1300 may determine whether a voice activation condition and a voice deactivation condition are satisfied. In an embodiment, the processor 1300 may determine whether the voice activation condition and the voice deactivation condition are satisfied, based on a combination of the presence or absence of script input, sound information received by using a microphone, a slope of the first device 1000, a distance from a user's face, and a user's lip movement. However, the method of determining the voice activation condition is not limited to the above-described embodiments.

The processor 1300 may automatically activate or deactivate the voice input interface included in the user inputter 1100, based on the determined voice activation condition or the determined voice deactivation condition.

Also, the processor 1300 may generate recommended voice text information from the voice input recognized by using the user inputter 1100, based on context information. The processor 1300 may provide the generated recommended voice text information to the user.

The processor 1300 may control the user inputter 1100 to receive a user input of selecting one of pieces of the provided recommended voice text information as voice text information by using the auxiliary voice input interface included in the user inputter 1100. Also, the processor 1300 may generate script text information based on the script input recognized by using the script input interface. The processor 1300 may generate text information by combining the selected voice text information with the script text information.

The processor 1300 may control the display 1210 such that the generated text information is displayed thereon. In order to display the text information, the processor 1300 may display the script text information and the voice text information in the order of generation.

The sensor 1400 may sense a state of the first device 1000 or a state around the first device 1000 and transmit sensed information to the processor 1300.

The sensor 1400 may include at least one of a geomagnetic sensor 1410, an acceleration sensor 1420, a temperature/humidity sensor 1430, an infrared sensor 1440, a gyroscope sensor 1450, a position sensor (e.g., GPS) 1460, a barometric sensor 1470, a proximity sensor 1480, and an RGB sensor (illuminance sensor) 1490, but the present disclosure is not limited thereto. Because the functions of the respective sensors may be intuitively inferred from their names, detailed descriptions thereof will be omitted.

The communicator 1500 may include one or more elements for communication between the first device 1000 and a head mounted display (HMD) device or communication between the first device 1000 and a server. For example, the communicator 1500 may include a short-range wireless communicator 1510, a mobile communicator 1520, and a broadcasting receiver 1530.

The short-range wireless communicator 1510 may include a Bluetooth communicator, a Bluetooth Low Energy (BLE) communicator, a near field communicator, a wireless local area network (WLAN) (Wi-Fi) communicator, a Zigbee communicator, an infrared data association (IrDA) communicator, a Wi-Fi direct (WFD) communicator, an ultra-wideband (UWB) communicator, an Ant+ communicator, and the like, but the present disclosure is not limited thereto.

The mobile communicator 1520 may transmit and receive a wireless signal with at least one of a base station, an external terminal, or a server on a mobile communication network. Examples of the wireless signal may include a voice call signal, a video call signal, and various types of data according to transmission or reception of text/multimedia messages.

The broadcasting receiver 1530 may receive a broadcasting signal and/or broadcasting-related information from the outside via a broadcasting channel. The broadcasting channel may include a satellite channel, a ground wave channel, or the like. The first device 1000 may not include the broadcasting receiver 1530 according to an implementation example.

Also, the communicator 1500 may transmit or receive information for using context information with an HMD device, a server, and a peripheral device.

The A/V inputter 1600 may be provided for input of an audio signal or a video signal. For the input of the audio signal or the video signal, the A/V inputter 1600 may include a camera 1610, a microphone 1620, and the like. The camera 1610 may obtain an image frame, such as a still image or a moving image, through an image sensor in a video call mode or an image capture mode. An image captured by the image sensor may be processed by the processor 1300 or a separate image processor (not illustrated).

The image frame processed by the camera 1610 may be stored in the memory 1700 or may be transmitted to the outside through the communicator 1500. Alternatively, the image frame may be used for the operation, performed by the processor 1300, of determining the voice activation condition and the voice deactivation condition. The camera 1610 may include two or more cameras according to a configuration of a terminal.

The microphone 1620 may receive an external audio signal and process the external audio signal into electrical voice data. For example, the microphone 1620 may receive an audio signal from an external device or a person. The microphone 1620 may use various noise cancellation algorithms for cancelling noise generated in a process of receiving an external audio signal. The audio signal received through the microphone 1620 may be used for the operation, performed by the processor 1300, of determining the voice activation condition and the voice deactivation condition.

The memory 1700 may store programs for processing and control of the processor 1300 and may store data input to the first device 1000 or data output from the first device 1000.

The memory 1700 may include at least one type of storage medium selected from among a flash memory type, a hard disk type, a multimedia card micro type, a card type memory (for example, a secure digital (SD) or extreme digital (XD) memory), random access memory (RAM), static random access memory (SRAM), read-only memory (ROM), electrically erasable programmable ROM (EEPROM), programmable ROM (PROM), magnetic memory, magnetic disk, and optical disk.

The programs stored in the memory 1700 may be classified into a plurality of modules according to functions thereof. For example, the programs may be classified into a UI module 1710, a touch screen module 1720, and a notification module 1730.

The UI module 1710 may provide a specialized UI or GUI that interoperates with the first device 1000 according to each application. The touch screen module 1720 may detect a user's touch gesture on a touch screen and transmit information about the touch gesture to the processor 1300. The touch screen module 1720 according to some embodiments may recognize and analyze a touch code. The touch screen module 1720 may be implemented as separate hardware including a controller.

Various sensors may be provided inside or near the touch screen so as to detect a touch on the touch screen or hovering above the touch screen. An example of the sensor that detects the touch on the touch screen may be a tactile sensor. The tactile sensor may detect a contact of a specific object at or beyond a sensitivity of a person. The tactile sensor may sense various pieces of information, such as roughness of a contact surface, hardness of a contact object, or a temperature of a contact point.

Also, an example of the sensor that detects the touch on the touch screen may be a proximity sensor.

The proximity sensor refers to a sensor that detects the presence or absence of an object approaching a certain detection surface or an object existing near the sensor by using an electromagnetic force or infrared light, without mechanical contact. Examples of the proximity sensor include a transmission-type photoelectric sensor, a direct reflection-type photoelectric sensor, a mirror reflection-type photoelectric sensor, a high frequency oscillation-type proximity sensor, a capacity-type proximity sensor, a magnetic proximity sensor, and an infrared-type proximity sensor. The user's touch gesture may include a tap, a touch-and-hold, a double-tap, a drag, a panning, a flick, a drag-and-drop, a swipe, and the like.

The notification module 1730 may output a signal for notifying that an event occurs in the first device 1000. Examples of events occurring in the first device 1000 include a call signal reception, a message reception, a key signal input, and a schedule notification. The notification module 1730 may output a notification signal through the display 1210 in the form of a video signal. The notification module 1730 may output a notification signal through the audio outputter 1220 in the form of an audio signal. The notification module 1730 may output a notification signal through the vibration motor 1230 in the form of a vibration signal.

Figure 15:
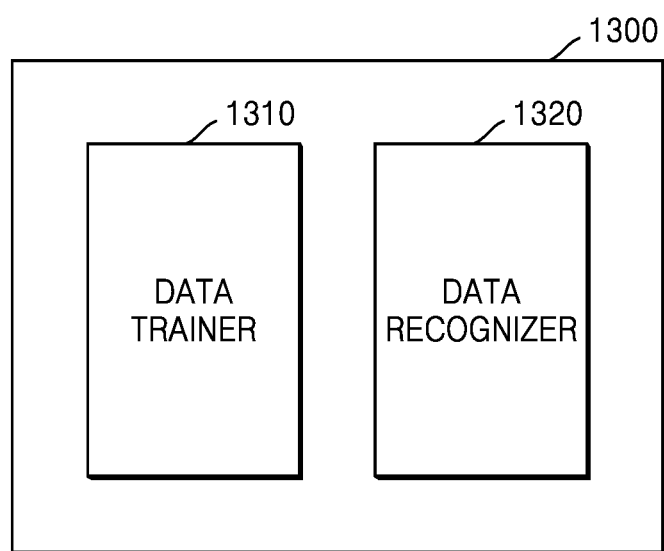
FIG. 15 is a block diagram of a processor according to some embodiments.

FIG. 15 is a block diagram of the processor 1300 according to some embodiments.

Referring to FIG. 15, the processor 1300 according to some embodiments may include a data trainer 1310 and a data recognizer 1320.

According to an embodiment, at least part of the data trainer 1310 and at least part of the data recognizer 1320 may be implemented as a software module or may be manufactured in the form of a hardware chip and mounted on a text input device.

The data trainer 1310 may learn a criterion for determining a voice activation and deactivation conditions and generating recommended voice text information. The data trainer 1310 may learn a criterion regarding which data is to be used for determining the voice activation and deactivation conditions and generating the recommended voice text information. Also, the data trainer 1310 may learn a criterion regarding how to determine the intention of the user by using data, how to obtain and provide associated information, and how to determine the voice activation and deactivation conditions and generate the recommended voice text information. The data trainer 1310 may learn a criterion for determining the voice activation and deactivation conditions and generating the recommended voice text information by obtaining data to be used for learning and applying the obtained data to a data recognition model to be described below.

Types of training data input to the data trainer 1310 may include voice data, text data, and the like.

The data recognizer 1320 may determine the voice activation and deactivation conditions or generate the recommended voice text information, based on the data. The data recognizer 1320 may determine the voice activation and deactivation conditions or generate the recommended voice text information from certain data by using the learned data recognition model. The data recognizer 1320 may obtain certain data according to a preset criterion obtained by learning and use the data recognition model using the obtained data as an input value. Also, the data recognizer 1320 may use the data recognition model to determine the voice activation and deactivation conditions or generate the recommended voice text information, based on certain data. Also, a result value output by the data recognition model using the obtained data as the input value may be used to update the data recognition model.

At least one of the data trainer 1310 and the data recognizer 1320 may be manufactured in the form of at least one hardware chip and mounted on the first device 1000. For example, at least one of the data trainer 1310 and the data recognizer 1320 may be manufactured in the form of a dedicated hardware chip for artificial intelligence (AI), or may be manufactured as part of an existing general-purpose processor (e.g., central processing unit (CPU) or application processor) or a dedicated graphics processor (e.g., graphics processing unit (GPU)) and mounted on the first device 1000. In this case, the dedicated hardware chip for AI is a dedicated processor specialized for probability calculation. Because the dedicated hardware chip has higher parallel processing performance than that of the existing general-purpose processor, it is possible to quickly process computational operations in an AI field such as machine learning.

The data trainer 1310 and the data recognizer 1320 may be mounted on a single text input device, or may be respectively mounted on separate devices. For example, one of the data trainer 1310 and the data recognizer 1320 may be included in the single text input device, and the other thereof may be included in the server. Also, model information constructed by the data trainer 1310 may be provided to the data recognizer 1320 through wired or wireless communication, and data input to the data recognizer 1320 may be provided to the data trainer 1310 as additional training data.

At least one of the data trainer 1310 and the data recognizer 1320 may be implemented as at least one software module. When at least one of the data trainer 1310 and the data recognizer 1320 is implemented as a software module (or a program module including instructions), the software module may be stored in a non-transitory computer-readable medium. Also, in this case, at least one software module may be provided by an operating system (OS) or may be provided by a certain application. Alternatively, part of at least one software module may be provided by an OS, and the remaining part thereof may be provided by a certain application.

Figure 16:
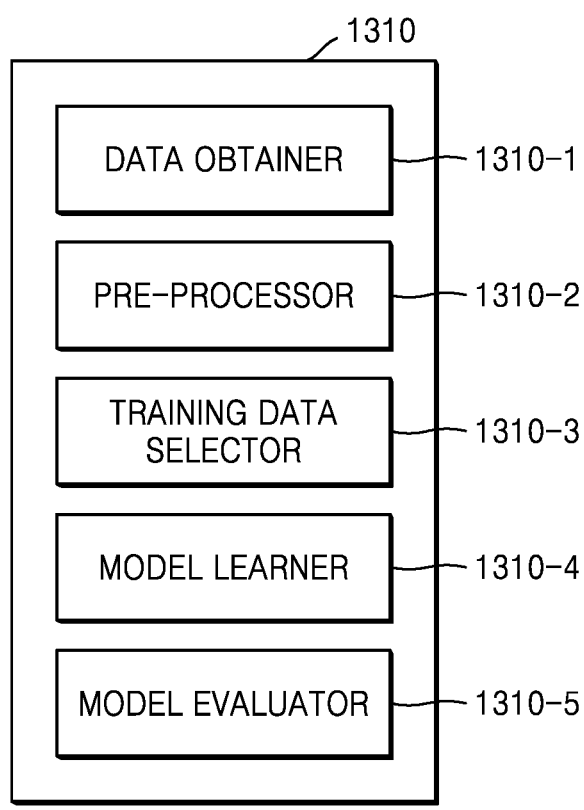
FIG. 16 is a block diagram of a data trainer according to some embodiments.

FIG. 16 is a block diagram of the data trainer 1310 according to some embodiments.

Referring to FIG. 16, the data trainer 1310 according to some embodiments may include a data obtainer 1310-1, a pre-processor 1310-2, a training data selector 1310-3, a model learner 1310-4, and a model evaluator 1310-5.

The data obtainer 1310-1 may obtain data necessary for determining a voice activation and deactivation conditions or generating recommended voice text information. The data obtainer 1310-1 may obtain, for example, a certain user voice and certain context information.

The pre-processor 1310-2 may pre-process the obtained data such that the obtained data is used for learning for determining the voice activation and deactivation conditions or generating the recommended voice text information. The pre-processor 1310-2 may process the obtained data into a preset format such that the model learner 1310-4 to be described below is enabled to use the obtained data for learning for determining the voice activation and deactivation conditions and generating the recommended voice text information.

The training data selector 1310-3 may select data necessary for learning from among pieces of pre-processed data. The selected data may be provided to the model learner 1310-4. The training data selector 1310-3 may select data necessary for learning from among pieces of pre-processed data according to a preset criterion for determining the voice activation and deactivation conditions and generating the recommended voice text information. Also, the training data selector 1310-3 may select data according to a preset criterion by learning performed by the model learner 1310-4 to be described below.

The model learner 1310-4 may learn a criterion regarding whether to determine the voice activation and deactivation conditions or generate the recommended voice text information, based on training data. Also, the model learner 1310-4 may learn a criterion regarding which training data is to be used for determining the voice activation and deactivation conditions and generating the recommended voice text information.

Also, the model learner 1310-4 may learn a criterion regarding which training data is to be used for determining the voice activation and deactivation conditions and generating the recommended voice text information. In this case, the data recognition model may be a pre-constructed model. For example, the data recognition model may be a model that is pre-constructed by receiving basic training data (e.g., sample data, etc.).

The data recognition model may be constructed considering the application field of the recognition model, the purpose of learning, the computer performance of the device, or the like. The data recognition model may be designed to simulate a human brain structure on a computer. The data recognition model may include a plurality of network nodes having weights, which simulate neurons of a human neural network. The network nodes may form a connection relationship such that the neurons simulate the synaptic activity of the neurons that exchange signals through synapses. The data recognition model may include, for example, a neural network model, or a deep learning model developed from the neural network model. In the deep learning model, a plurality of network nodes may be located at different depths (or layers) and exchange data according to a convolutional connection relationship. For example, the data recognition model may include models such as a deep neural network (DNN), a recurrent neural network (RNN), or a bidirectional recurrent deep neural network (BRDNN), but the present disclosure is not limited thereto.

According to various embodiments, when there are a plurality of pre-constructed recognition models, the model learner 1310-4 may determine, as a data recognition model to be learned, a data recognition model having a large correlation between input training data and basic training data. In this case, the basic training data may be previously classified for each data type, and the data recognition model may be pre-constructed for each data type. For example, the basic training data may be previously classified based on various criteria such as a region in which the training data is generated, a time at which the training data is generated, a size of the training data, a genre of the training data, a creator of the training data, and a type of an object in the training data.

Also, the model learner 1310-4 may learn the data recognition model by using, for example, a learning algorithm including error back-propagation or gradient descent.

Also, the model learner 1310-4 may learn the data recognition model through, for example, supervised learning using the training data as the input value. Also, the model learner 1310-4 may self-learn the type of data necessary for determining the situation without separate supervision, so as to learn the data recognition model through unsupervised learning that finds a criterion for determining the situation. Also, the model learner 1310-4 may learn the data recognition model through, for example, reinforcement learning using a feedback on whether a result of determining a situation according to learning is correct.

Also, when the data recognition model is learned, the model learner 1310-4 may store the learned data recognition model. In this case, the model learner 1310-4 may store the learned data recognition model in the memory of the electronic device including the data recognizer 1320. Alternatively, the model learner 1310-4 may store the learned data recognition model in the memory of the electronic device including the data recognizer 1320, which is to be described below. Alternatively, the model learner 1310-4 may store the learned data recognition model in a memory of a server connected to the electronic device via a wired or wireless network.

In this case, the memory in which the learned data recognition model is stored may also store, for example, commands or data associated with at least one other element of the electronic device. Also, the memory may store software and/or programs. The programs may include, for example, kernel, middleware, application programming interface (API), and/or application programs (or "applications").

When evaluation data is input to the data recognition model and a recognition result output from the evaluation data does not satisfy a certain criterion, the model evaluator 1310-5 may cause the model learner 1310-4 to learn again. In this case, the evaluation data may be data preset for evaluating the data recognition model.

For example, when the number or ratio of evaluation data, an analysis result of which is inaccurate among analysis results of the learned data recognition model for the evaluation data, exceeds a preset threshold value, the model evaluator 1310-5 may evaluate that the certain criterion is not satisfied. For example, in a case in which the certain criterion is defined as a ratio of 2%, when the learned data recognition model outputs an incorrect recognition result for more than 20 pieces of evaluation data among a total of 1,000 pieces of evaluation data, the model evaluator 1310-5 may evaluate that the learned data recognition model is unsuitable.

When there are a plurality of learned data recognition models, the model evaluator 1310-5 may evaluate whether each learned data recognition model satisfies the certain criterion and determine a model satisfying the certain criterion as a final data recognition model. In this case, when there are a plurality of models satisfying the certain criterion, the model evaluator 1310-5 may determine, as the final data recognition model, any one model or a certain number of models that are preset in the descending order of evaluation scores.

At least one of the data obtainer 1310-1, the pre-processor 1310-2, the training data selector 1310-3, the model learner 1310-4, and the model evaluator 1310-5 in the data trainer 1310 may be manufactured in the form of a hardware chip and mounted on the electronic device. For example, at least one of the data obtainer 1310-1, the pre-processor 1310-2, the training data selector 1310-3, the model learner 1310-4, and the model evaluator 1310-5 may be manufactured in the form of a dedicated hardware chip for AI, or may be manufactured as part of an existing general-purpose processor (e.g., CPU or application processor) or a dedicated graphics processor (e.g., GPU) and mounted on the above-described various electronic devices.

Also, the data obtainer 1310-1, the pre-processor 1310-2, the training data selector 1310-3, the model learner 1310-4, and the model evaluator 1310-5 may be mounted on the single electronic device or may be respectively mounted on separate electronic devices. For example, some of the data obtainer 1310-1, the pre-processor 1310-2, the training data selector 1310-3, the model learner 1310-4, and the model evaluator 1310-5 may be included in the electronic device, and the others thereof may be included in the server.

Also, at least one of the data obtainer 1310-1, the pre-processor 1310-2, the training data selector 1310-3, the model learner 1310-4, and the model evaluator 1310-5 may be implemented as a software module. When at least one of the data obtainer 1310-1, the pre-processor 1310-2, the training data selector 1310-3, the model learner 1310-4, and the model evaluator 1310-5 is implemented as a software module (or a program module including instructions), the software module may be stored in a non-transitory computer-readable medium. Also, in this case, at least one software module may be provided by an OS or may be provided by a certain application. Alternatively, part of at least one software module may be provided by an OS, and the remaining part thereof may be provided by a certain application.

Figure 17:
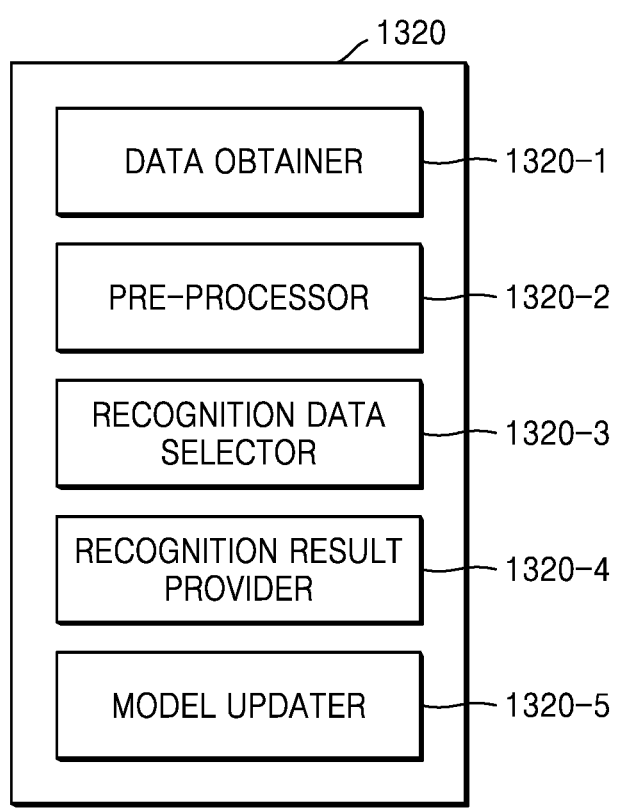
FIG. 17 is a block diagram of a data recognizer according to some embodiments.

FIG. 17 is a block diagram of the data recognizer 1320 according to some embodiments.

Referring to FIG. 17, the data recognizer 1320 according to some embodiments may include a data obtainer 1320-1, a pre-processor 1320-2, a recognition data selector 1320-3, a recognition result provider 1320-4, and a model updater 1320-5.

The data obtainer 1320-1 may obtain data necessary for situation determination, and the pre-processor 1320-2 may pre-process the obtained data so as to enable the data obtained for the situation determination to be used. The pre-processor 1320-2 may process the obtained data into a preset format such that the recognition result provider 1320-4 uses the obtained data for situation determination.

The recognition data selector 1320-3 may select data necessary for the situation determination from among pieces of the pre-processed data. The selected data may be provided to the recognition result provider 1320-4. The recognition data selector 1320-3 may select all or part of the pre-processed data according to a preset criterion for the situation determination. Also, the recognition data selector 1320-3 may select data according to a preset criterion by learning performed by the model learner 1310-4 to be described below.

The recognition result provider 1320-4 may determine the situation by applying the selected data to the data recognition model. The recognition result provider 1320-4 may provide a recognition result according to a data recognition purpose. The recognition result provider 1320-4 may apply the selected data to the data recognition model by using the data selected by the recognition data selector 1320-3 as an input value. Also, the analysis result may be determined by the data recognition model.

The model updater 1320-5 may update the data recognition model based on the evaluation of the recognition result provided by the recognition result provider 1320-4. For example, the model updater 1320-5 may provide, to the model learner 1310-4, the recognition result provided by the recognition result provider 1320-4, such that the model learner 1310-4 updates the data recognition model.

At least one of the data obtainer 1320-1, the pre-processor 1320-2, the recognition data selector 1320-3, the recognition result provider 1320-4, and the model updater 1320-5 in the data recognizer 1320 may be manufactured in the form of a hardware chip and mounted on the electronic device. For example, at least one of the data obtainer 1320-1, the pre-processor 1320-2, the recognition data selector 1320-3, the recognition result provider 1320-4, and the model updater 1320-5 may be manufactured in the form of a dedicated hardware chip for AI, or may be manufactured as part of an existing general-purpose processor (e.g., CPU or application processor) or a dedicated graphics processor (e.g., GPU) and mounted on the above-described various electronic devices.

Also, the data obtainer 1320-1, the pre-processor 1320-2, the recognition data selector 1320-3, the recognition result provider 1320-4, and the model updater 1320-5 may be mounted on the single electronic device or may be respectively mounted on separate electronic devices. For example, some of the data obtainer 1320-1, the pre-processor 1320-2, the recognition data selector 1320-3, the recognition result provider 1320-4, and the model updater 1320-5 may be included in the electronic device, and the others thereof may be included in the server.

Also, at least one of the data obtainer 1320-1, the pre-processor 1320-2, the recognition data selector 1320-3, the recognition result provider 1320-4, and the model updater 1320-5 may be implemented as a software module. When at least one of the data obtainer 1320-1, the pre-processor 1320-2, the recognition data selector 1320-3, the recognition result provider 1320-4, and the model updater 1320-5 is implemented as a software module (or a program module including instructions), the software module may be stored in a non-transitory computer-readable medium. Also, in this case, at least one software module may be provided by an OS or may be provided by a certain application. Alternatively, part of at least one software module may be provided by an OS, and the remaining part thereof may be provided by a certain application.

Figure 18:
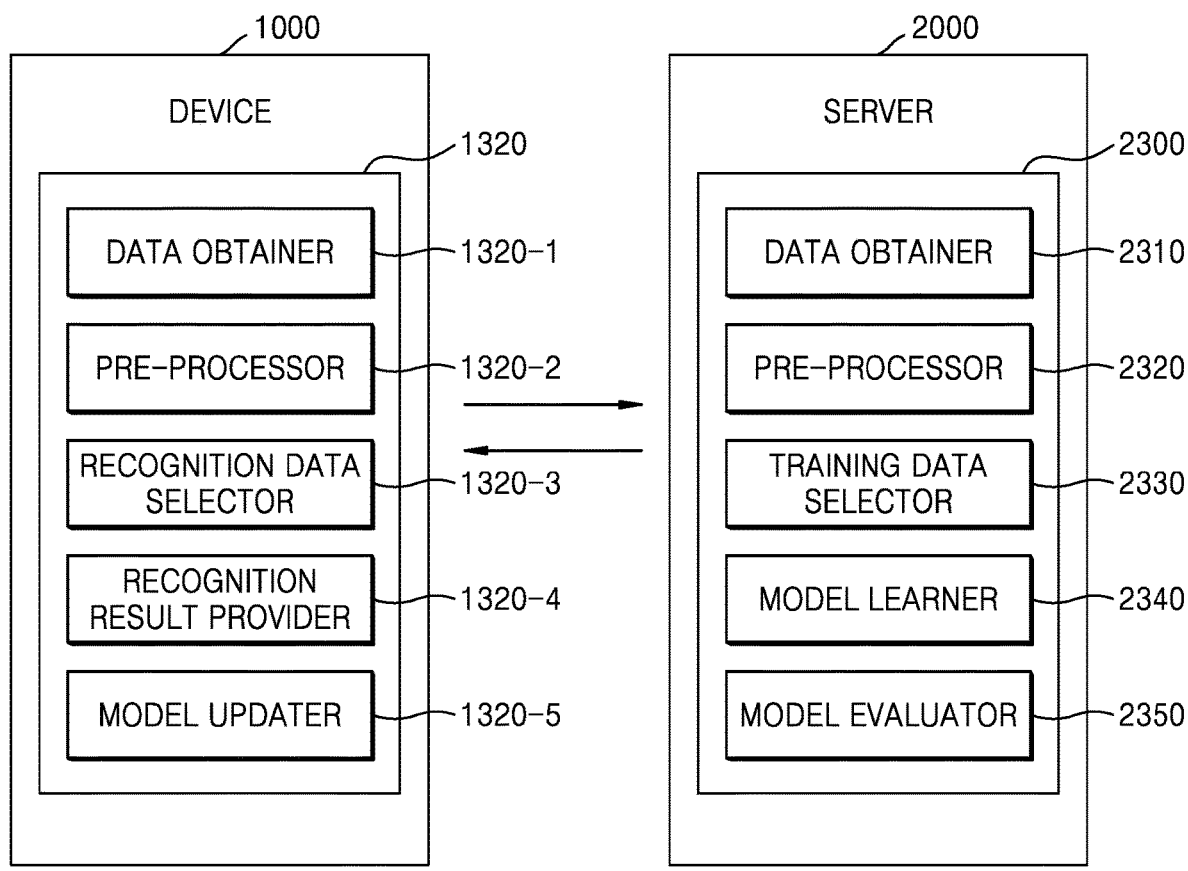
FIG. 18 is a diagram illustrating an example in which a text input device and a server interoperate with each other to train and recognize data, according to some embodiments.

FIG. 18 is a diagram illustrating an example in which a text input device 1000 and a server 2000 interoperate with each other to train and recognize data, according to some embodiments.

Referring to FIG. 18, the server 2000 may learn a criterion for determining voice activation and deactivation conditions and generating recommended voice text information, and the text input device 1000 may determine the determination of the voice activation and deactivation conditions and the generation of the recommended voice text information, based on a result of learning performed by the server 2000.

In this case, a model learner 2340 of the server 2000 may perform the function of the data trainer 1310 illustrated in FIG. 16. A model learner 2340 of the server 2000 may learn a criterion regarding which data is to be used for determining the voice activation and deactivation conditions and generating the recommended voice text information. Also, the model learner 2340 of the server 2000 may learn a criterion for determining the voice activation and deactivation conditions and generating the recommended voice text information by using data. The model learner 2340 may learn a criterion for determining the voice activation and deactivation conditions and generating the recommended voice text information by obtaining data to be used for learning and applying the obtained data to a data recognition model to be described below.

Also, the recognition result provider 1320-4 of the text input device 1000 may determine voice activation and deactivation conditions and generate recommended voice text information by applying the data selected by the recognition data selector 1320-3 to a data recognition model generated by the server 2000. For example, the recognition result provider 1320-4 may transmit the data selected by the recognition data selector 1320-3 to the server 2000, and the server 2000 may make a request for determining the voice activation and deactivation conditions and generating the recommended voice text information by applying the data selected by the recognition data selector 1320-3 to the data recognition model. Also, the recognition result provider 1320-4 may receive, from the server 2000, information about the determination of the voice activation and deactivation conditions and the generation of the recommended voice text information, which are determined by the server 2000.

Alternatively, the recognition result provider 1320-4 of the text input device 1000 may receive, from the server 2000, the data recognition model generated by the server 2000 and may use the received data recognition model to determine the voice activation and deactivation conditions and generate the recommended voice text information. In this case, the recognition result provider 1320-4 of the text input device 1000 may determine the voice activation and deactivation conditions and generate the recommended voice text information by applying the data selected by the recognition data selector 1320-3 to the data recognition model received from the server 2000.

Also, the text input device 1000 and the server 2000 may effectively distribute and perform operations for the learning of the data recognition model and the data recognition. In this manner, data processing may be efficiently performed so as to provide a service matching a user's intention and a user's privacy may be effectively protected.

Some embodiments of the present disclosure may be implemented as a software program that includes instructions stored in a computer-readable storage medium.

For example, a computer is a device capable of calling the stored instructions from the storage medium and performing the operations of the embodiments according to the called instructions. The computer may include the device according to the embodiments or an external server communicatively connected to the device.

The computer-readable storage medium may be provided in the form of a non-transitory storage medium. The term "non-transitory" means that the storage media does not include a signal or current and is tangible, and does not distinguish between semi-permanent and temporary storage of data in the storage medium. For example, the non-transitory storage medium may include not only a non-transitory readable storage medium such as compact disc (CD), digital versatile disc (DVD), hard disk, Blu-ray disk, universal serial bus (USB), internal memory, memory card, ROM, or RAM, but also a temporary storage medium such as register, cache, or buffer.

Also, the methods according to the embodiments may be provided as a computer program product.

The computer program product may include a software program, a computer-readable storage medium on which the software program is stored, or a product traded between a seller and a buyer.

For example, the computer program product may include a product (e.g., downloadable app) of a software program form that is distributed electronically through a device manufacturer or an electronic market (e.g., Google Play Store, App Store, etc.). For electronic distribution, at least part of the software program may be stored in a storage medium or may be temporarily generated. In this case, the storage medium may be a server of a manufacturer or an electronic market, or a storage medium of a relay server.

The invention claimed is:

1. An electronic device comprising:
a display;
a microphone;
a memory configured to store at least one instruction; and
at least one processor which is, by executing the at least one instruction, configured to:
activate a voice input function based on a user input,
based on the voice input function being activated, display, on the display, a graphic representation for indicating that the voice input function is activated,
while the graphic representation indicating that the voice input function is activated is displayed, display, on the display, a text display area for displaying text inputted by a plurality of user input methods and a keyboard input interface including a plurality of virtual buttons respectively corresponding to a plurality of alphabet characters which are displayed differently according to a selected language for receiving a user keyboard input, the plurality of user input methods including a user keyboard input method and a user voice input method,
receive, via the plurality of virtual buttons included in the keyboard input interface, the user keyboard input corresponding to a first text while the graphic representation indicating that the voice input function is activated is displayed,
display, on the display, the first text in the text display area based on the receiving the user keyboard input together with the graphic representation indicating that the voice input function is activated,
automatically receive, via the microphone, a user voice input corresponding to a second text without an additional user input for activating the voice input function of the electronic device while both of the keyboard input interface including the plurality of virtual buttons respectively corresponding to the plurality of alphabet characters, and the graphic representation indicating that the voice input function is activated are displayed on the display, and display, on the display, the second text next to the first text in the text display area based on the receiving the user voice input, wherein a display order of the first text obtained from the user keyboard input and the second text obtained from the user voice input is changeable based at least on an input order of the user keyboard input and the user voice input while the graphic representation indicating that the voice input function is activated is displayed on the display.

2. The electronic device of claim 1, wherein, based on the receiving the user voice input, a recommended word is provided and the recommended word is selected to be displayed in the text display area.

3. The electronic device of claim 1, wherein the user input comprises uttering a voice by a user that is detected by the microphone.

4. The electronic device of claim 1, wherein the user input comprises changing a position of the electronic device, and
wherein the changing of the position is detected by at least one of an accelerometer or a gyroscope, of the electronic device.

5. The electronic device of claim 4, wherein the changed position of the electronic device is suitable for a user to view the display of the electronic device.

6. The electronic device of claim 1, wherein the user input comprises a user's contact with the electronic device.

7. The electronic device of claim 1, wherein the graphic representation comprises an icon related to the voice input function.

8. The electronic device of claim 1, wherein, based on the receiving the user voice input, a recommended word is provided between the keyboard input interface and the text display area.

9. The electronic device of claim 1, wherein, based on the receiving the user voice input, a recommended word is provided based on usage history information of a user.

10. The electronic device of claim 9, wherein the usage history information comprises a history of a function executed in an application.

11. The electronic device of claim 9, wherein the usage history information comprises a history of a text messaging of the user.

12. The electronic device of claim 9, wherein the usage history information comprises a pattern of words being input by the user.

13. The electronic device of claim 1, wherein the at least one processor is further configured to:
transmit the user voice input to a server for at least one of an analysis or a processing.

14. The electronic device of claim 1, wherein, based on the receiving the user voice input, a recommended word is provided by using a model trained by at least one of a server or the electronic device.

15. The electronic device of claim 1, wherein, based on the receiving the user voice input, a recommended word is provided by using a model received from a server.

16. The electronic device of claim 1, wherein, based on the receiving the user voice input, a recommended word is provided and the recommended word is related to at least one of the first text or the second text.

17. A method performed by an electronic device, the method comprising:
activating a voice input function based on a user input;
based on the voice input function being activated, displaying, on a display of the electronic device, a graphic representation for indicating that the voice input function is activated;
while the graphic representation indicating that the voice input function is activated is displayed, displaying, on the display, a text display area for displaying text inputted by a plurality of user input methods and a keyboard input interface including a plurality of virtual buttons respectively corresponding to a plurality of alphabet characters which are displayed differently according to a selected language for receiving a user keyboard input, the plurality of user input methods including a user keyboard input method and a user voice input method;
receiving, via the plurality of virtual buttons included in the keyboard input interface, the user keyboard input corresponding to a first text while the graphic representation indicating that the voice input function is activated is displayed;
displaying, on the display, the first text in the text display area based on the receiving the user keyboard input together with the graphic representation indicating that the voice input function is activated;
automatically receiving, via a microphone, a user voice input corresponding to a second text without an additional user input for activating the voice input function of the electronic device while both of the keyboard input interface including the plurality of virtual buttons respectively corresponding to the plurality of alphabet characters, and the graphic representation indicating that the voice input function is activated are displayed on the display; and
displaying, on the display, the second text next to the first text in the text display area based on the receiving the user voice input,
wherein a display order of the first text obtained from the user keyboard input and the second text obtained from the user voice input is changeable based at least on an input order of the user keyboard input and the user voice input while the graphic representation indicating that the voice input function is activated is displayed on the display.

18. A non-transitory computer-readable medium having instructions recorded thereon which, when executed by at least one processor, cause the at least one processor to execute the method of claim 17.

* * * * *